(12) United States Patent
Moyes et al.

(10) Patent No.: US 12,386,675 B2
(45) Date of Patent: Aug. 12, 2025

(54) ORCHESTRATION OF OPERATIONS ON A CLOUD PLATFORM BASED ON MULTIPLE VERSION MAPS OF SERVICES

(71) Applicant: Salesforce, Inc., San Francisco, CA (US)

(72) Inventors: Christopher Steven Moyes, San Mateo, CA (US); Zemann Phoesop Sheen, San Francisco, CA (US); Srinivas Dhruvakumar, Vancouver (CA); Mayakrishnan Chakkarapani, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 479 days.

(21) Appl. No.: 17/877,766

(22) Filed: Jul. 29, 2022

(65) Prior Publication Data
US 2024/0036929 A1    Feb. 1, 2024

(51) Int. Cl.
  *G06F 9/50* (2006.01)
  *G06F 8/71* (2018.01)
  *G06F 8/60* (2018.01)

(52) U.S. Cl.
  CPC .............. *G06F 9/5072* (2013.01); *G06F 8/71* (2013.01); *G06F 8/60* (2013.01)

(58) Field of Classification Search
  CPC ............. G06F 9/5072; G06F 8/71; G06F 8/60
  See application file for complete search history.

(56) References Cited

U.S. PATENT DOCUMENTS

| | | |
|---|---|---|
| 8,051,028 B2 | 11/2011 | Karnik et al. |
| 9,419,856 B1 | 8/2016 | Chawla et al. |
| 9,680,696 B1 | 6/2017 | Firment et al. |
| 10,318,285 B1* | 6/2019 | Jodoin ................ G06F 11/3688 |
| 10,334,058 B2 | 6/2019 | Frank et al. |
| 11,018,938 B1 | 5/2021 | Gupta et al. |
| 11,093,227 B1 | 8/2021 | Shteyman et al. |
| 2012/0180024 A1 | 7/2012 | Gonzalez et al. |
| 2016/0291942 A1 | 10/2016 | Hutchison |
| 2017/0177324 A1 | 6/2017 | Frank et al. |

(Continued)

OTHER PUBLICATIONS

PCT International Search Report and Written Opinion, PCT Application No. PCT/US 23/11652, Apr. 14, 2023, 16 pages.
Austel, P. et al., "Continuous Delivery of Composite Solutions: A Case for Collaborative Software Defined PaaS Environments," BigSystem '15, Jun. 2015, pp. 3-6.

(Continued)

*Primary Examiner* — Brian W Wathen

(57) ABSTRACT

Computing systems, for example, multi-tenant systems deploy software artifacts in datacenters created in a cloud platform. The system receives multiple version maps. Each version map provides version information for a particular context associated with the datacenter. The context may specify a target environment, a target datacenter entity, or a target action to be performed on the cloud platform. The system generates an aggregate pipeline comprising a hierarchy of pipelines. The system generates an aggregate version map associating datacenter entities of the datacenter with versions of software artifacts targeted for deployment on the datacenter entities and versions of pipelines. The system executes the aggregate pipeline in conjunction with the aggregate version map to perform requested operations on the datacenter configured on the cloud platform, for example, provisioning resources or deploying services.

20 Claims, 16 Drawing Sheets

(56) References Cited

U.S. PATENT DOCUMENTS

| | | | |
|---|---|---|---|
| 2017/0180266 A1* | 6/2017 | Frank | H04L 67/51 |
| 2017/0262298 A1 | 9/2017 | Frank et al. | |
| 2018/0048521 A1 | 2/2018 | Nair et al. | |
| 2018/0329738 A1 | 11/2018 | Kasha et al. | |
| 2018/0364985 A1 | 12/2018 | Liu et al. | |
| 2019/0129712 A1* | 5/2019 | Hawrylo | G06F 8/20 |
| 2019/0138288 A1* | 5/2019 | Brealey | G06F 8/77 |
| 2019/0377570 A1 | 12/2019 | Govindaraju et al. | |
| 2020/0117434 A1 | 4/2020 | Biskup et al. | |
| 2020/0125344 A1 | 4/2020 | Varghese et al. | |
| 2021/0055917 A1* | 2/2021 | Khakare | G06F 9/45558 |
| 2021/0064355 A1* | 3/2021 | Martinsson | G06F 8/64 |
| 2021/0203550 A1 | 7/2021 | Thakkar et al. | |
| 2021/0232388 A1* | 7/2021 | Mirantes | G06F 8/71 |
| 2021/0360066 A1 | 11/2021 | Karumbunathan et al. | |
| 2023/0102769 A1* | 3/2023 | Kirmse | G06F 9/5072 717/170 |

OTHER PUBLICATIONS

Burns, E. et al., "Continuous Delivery with Spinnaker," May 11, 2018, XP055626768, pp. 1-81.

Burns, E., "Why Spinnaker matters to CI/CD," Aug. 27, 2019, seven pages, [Online] [Retrieved on Jan. 19, 2021] Retrieved from the Internet <URL: https://opensource.com/article/19/8/why-spinnaker-matters-cicd>.

Mukherjee, J., "What is a continuous delivery pipeline?" Date Unknown, 14 pages, [Online] [Retrieved on Jan. 19, 2021] Retrieved from the Internet <URL: https://www.atlassian.com/continuous-delivery/pipeline>.

Thakur, V., "Continuous Delivery Pipeline for Kubernetes Using Spinnaker," May 27, 2020, 21 pages, [Online] [Retrieved on Jan. 19, 2021] Retrieved from the Internet <URL: https://www.metricfire.com/blog/continuous-delivery-pipeline-for-kubernetes-using-spinnaker/?GAID=undefined&GAID=undefined>.

* cited by examiner

700

Generating one or more datacenters based on a cloud platform independent declarative specification of a datacenter
710

↓

Generating a cloud platform independent master deployment pipeline for different environment
720

↓

Receiving customizations to logic for promotion of artifact from one stage to next
730

↓

Compiling the deployment pipeline to generate detailed cloud platform specific deployment pipeline
740

↓

Receiving code for releasing a feature on the target cloud platform
750

↓

Executing the cloud platform specific deployment pipeline to deploy software artifacts using the generated pipeline
760

Receiving the target service instance and a list of input version maps
1410

Identify all pipelines corresponding to the target service instance
1420

Build a map M1 from pipelines to version maps associated with the pipelines
1430

Initialize a map M2 from pipelines to the current best matching version map and the corresponding match rating
1440

Repeat for each (pipeline P, version map V) in M1

Determine match rating R for V
1450

If match rating R is better than the current best rating for pipeline P stored in map M2, replace the entry in M2 with version map V and rating R
1460

Generate an aggregate version map based on the version maps stored in map M2
1460

FIG. 14

ORCHESTRATION OF OPERATIONS ON A CLOUD PLATFORM BASED ON MULTIPLE VERSION MAPS OF SERVICES

BACKGROUND

Field of Art

This disclosure relates in general to orchestration of operations in a datacenter configured on a cloud computing platform, and in particular to orchestration of operations in on a cloud computing platform based on multiple version maps.

Description of the Related Art

Organizations are increasingly relying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. A large system such as a multi-tenant system may manage services for a large number of organizations representing tenants of the multi-tenant system and may interact with multiple cloud platforms. A multi-tenant system may have to maintain several thousand such datacenters on a cloud platform. Each datacenter may have different requirements for software releases. There is significant effort involved in provisioning resources such as database/accounts/computing clusters and deploying software in cloud platforms. Therefore, orchestrating operations such as provisioning deployment of services in a datacenter on the cloud platform is complex. Often the configuration involves manual steps and is prone to errors and security violations. These errors often lead to downtime. Such downtime for large systems such as multi-tenant systems may affect a very large number of users and result in significant disruption of services.

BRIEF DESCRIPTION OF DRAWINGS

FIG. 7 shows the overall process for generating pipelines for deployment of software artifacts on datacenters configured on a cloud platform according to an embodiment.

FIG. 14 shows the process of generating an aggregate version map, according to an embodiment.

Figure 1:
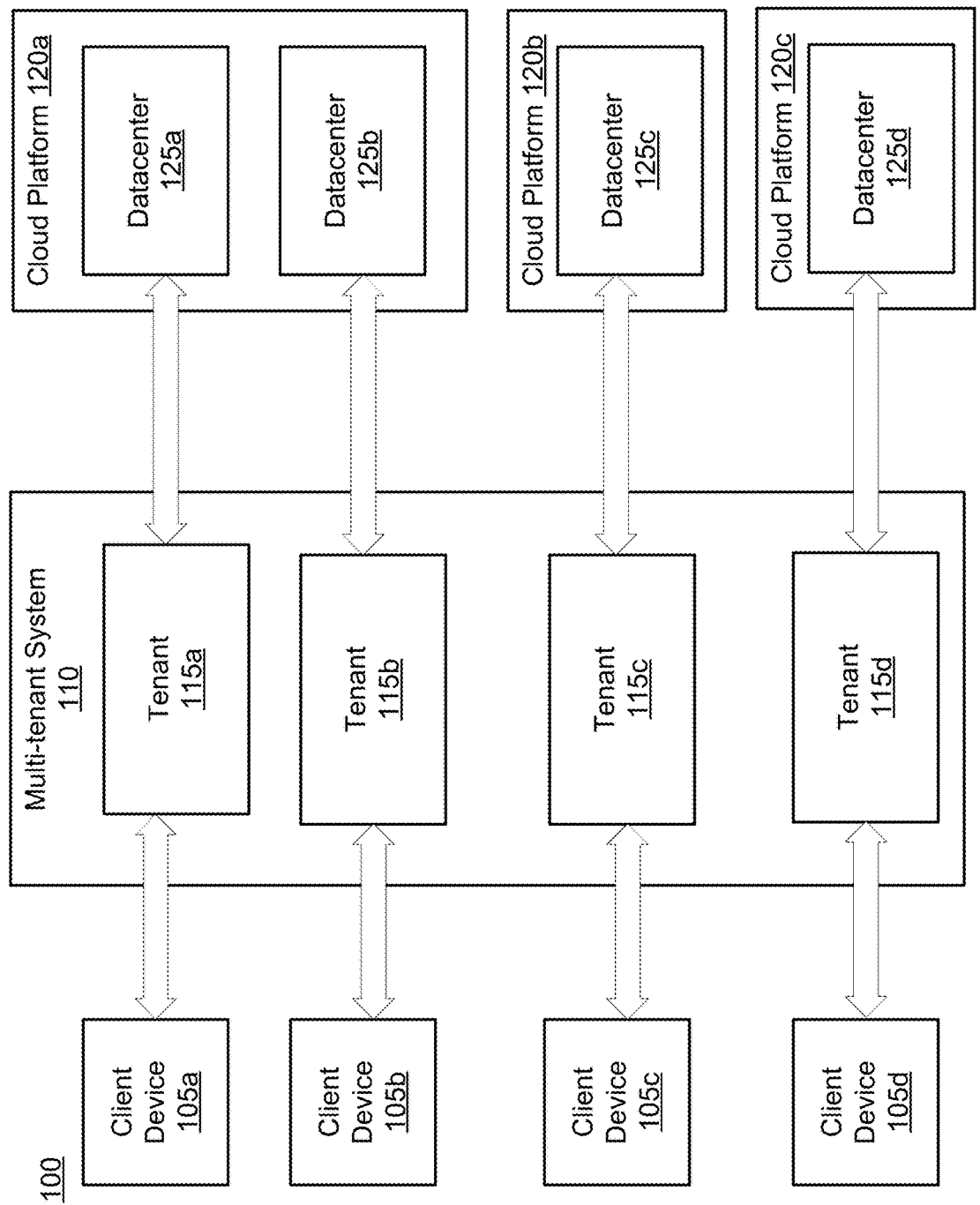
FIG. 1 is a block diagram of a system environment illustrating a multi-tenant system configuring datacenters on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a datacenter using computing resources of a cloud platform. However, implementing a datacenter on each cloud platform requires expertise in the technology of the cloud platform.

Embodiments create datacenters in a cloud platform using a cloud platform infrastructure language that is cloud platform independent. The system receives a cloud platform independent declarative specification of a datacenter. The declarative specification describes the structure of the datacenter and may not provide instructions specifying how to create the datacenter. The cloud platform independent declarative specification is configured to generate the datacenter on any of a plurality of cloud platforms and is specified using a cloud platform infrastructure language. The system receives information identifying a target cloud platform for creating the datacenter and compiles the cloud platform independent declarative specification to generate a cloud platform specific datacenter representation. The system sends the cloud platform specific datacenter representation and a set of instructions for execution on the target cloud platform. The target cloud platform executes the instructions to configure the datacenter using the platform specific datacenter representation. The system provides users with access to the computing resources of the datacenter configured by the cloud platform.

When a datacenter is created on a cloud platform there may be multiple operations that need to be performed on various datacenter entities of the datacenter. For example, the system may receive requests to deploy version V1 of service S1 of a service group G1, deploy version V2 of service S2 on a service group G1, and deploy version V3 of service S3 on a service group G2, and so on. Since there may various operations performed frequently on datacenter entities, for example, deployments, provisioning, patching, and so on, it is cumbersome to require the service owners to specify the version of each artifact to be used for each operation, the version of pipeline to use, and other configuration details for each operation. The system according to an embodiment, receives multiple version maps (also referred to as version manifests or deployment manifests) from service owners. A version map identifies versions of software artifacts, versions of pipelines, and any relevant configuration details. The system receives from service owners, information indicating the contexts in which each version map may be used. For example, the context may specify the type of datacenter entity (or specific names of datacenter entities) for which the version map is applicable, the type of environment (development environment, test environment, production environment), the type of operation (provisioning, deployment, patching, . . . ) for which the version map can be used, and so on. The system receives a runtime request to perform an operation for a particular environment on a set of datacenter entities. For example, the operation may be provisioning, the environment may be development environment, and the datacenter entity may be a particular service instance. The system analyzes the available version maps to identify the most appropriate version maps to use for the current context.

According to an embodiment, the system receives a cloud platform independent declarative specification for creating a datacenter on a cloud platform. The system generates an aggregate pipeline comprising a hierarchy of pipelines. The hierarchy of pipelines includes pipelines for creating datacenter entities of the datacenter. The aggregate pipeline is configured to create the datacenter. The system generates an aggregate deployment version map associating datacenter entities of the datacenter with versions of software artifacts targeted for deployment on the datacenter entities. The system collects a set of software artifacts according to the aggregate deployment version map. A software artifact is associated with a datacenter entity of the datacenter being created. The system executes the aggregate pipeline in conjunction with the aggregate deployment version map to create the datacenter in accordance with the cloud platform independent declarative specification. The aggregate pipeline configures services based on the set of software artifacts.

The system disclosed addresses the problem of create an aggregate version map that contains all deployment information for all possible targets in a cloud platform on which one or more operations are being performed. Users for example, system administrators of a tenant of a multi-tenant system may specify this information. This is cumbersome for users to specify and leads to information being defined twice in multiple places, for example, in the users existing version maps and the aggregate version map specified for a particular set of operations. Users provide a path to the aggregate version map through metadata which the system looks up to perform the required operations.

The advantages of the system disclosed include improved usability and ease of use for deployments in a cloud platform since service owners do not need to specify the version map for each deployment instance; improved reliability and faster onboarding time since there are fewer manual steps and also less likelihood of human errors; and improvement in storage efficiency as a result of removal of duplicate information defined and stored in multiple places. The storage efficiency is improved since users provide a single copy of each version map that may be used for multiple deployments.

A cloud platform is also referred to herein as a substrate. The declarative specification of datacenter is substrate independent or substrate agnostic. A datacenter configured on a cloud platform may also be referred to as a virtual datacenter. Although embodiments are described for datacenters configured on a cloud platform (i.e., virtual datacenters), the techniques disclosed can be applied to physical datacenters also.

The system may represent a multi-tenant system but is not limited to multi-tenant systems and can be any online system or any computing system with network access to the cloud platform. Systems and method describing deployment of artifacts in cloud platforms are described in U.S. patent application Ser. No. 17/110,224 filed on Dec. 2, 2020, and U.S. patent application Ser. No. 17/307,913 filed on May 4, 2021, and U.S. patent application Ser. No. 17/588,131 filed on Jan. 28, 2022, each of which is hereby incorporated by reference by its entirety.

System Environment

FIG. 1 is a block diagram of a system environment illustrating a multi-tenant system configuring datacenters on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105.

A cloud platform may also be referred to as a cloud computing platform or a public cloud environment. A tenant may use the cloud platform infrastructure language to provide a declarative specification of a datacenter that is created on a target cloud platform 120 and to perform operations using the datacenter, for example, provision resources, perform software releases and so on. A tenant 115 may create one or more datacenters on a cloud platform 120. A datacenter represents a set of computing resources including servers, applications, storage, memory, and so on that can be used by users, for example, users associated with the tenant. Each tenant may offer different functionality to users of the tenant. Accordingly, each tenant may execute different services on the datacenter configured for the tenant. The multi-tenant system may implement different mechanisms for release and deployment of software for each tenant. A tenant may further obtain or develop versions of software that include instructions for various services executing in a datacenter. Embodiments allow the tenant to deploy specific versions of software releases for different services running on different computing resources of the datacenter.

The computing resources of a datacenter are secure and may not be accessed by users that are not authorized to access them. For example, a datacenter 125a that is created for users of tenant 115a may not be accessed by users of tenant 115*b* unless access is explicitly granted. Similarly, datacenter 125*b* that is created for users of tenant 115*b* may not be accessed by users of tenant 115*a*, unless access is explicitly granted. Furthermore, services provided by a datacenter may be accessed by computing systems outside the datacenter, only if access is granted to the computing systems in accordance with the declarative specification of the datacenter.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more datacenters on one or more cloud platforms 120.

System Architecture

Figure 2A:
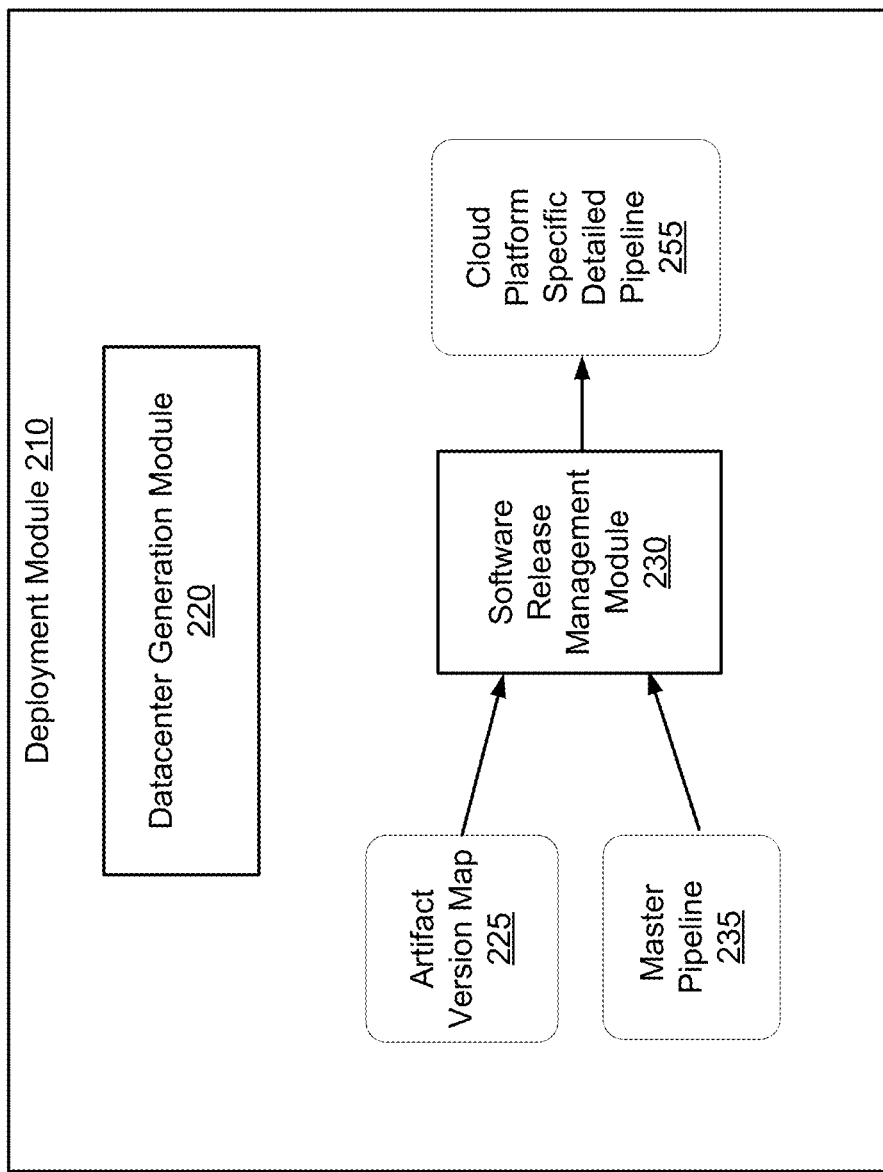
FIG. 2A is a block diagram illustrating the system architecture of a deployment module 210 according to an embodiment.

The multi-tenant system 110 includes a deployment module for deploying software artifacts on the cloud platforms. The deployment module can perform various operations associated with software releases, for example, provisioning resources on a cloud platform, deploying software releases, performing rollbacks of software artifacts installed on datacenter entities, and so on. FIG. 2 is a block diagram illustrating the system architecture of a deployment module 210 according to an embodiment. The deployment module 210 includes a datacenter generation module 220 and a software release management module 230. Other embodiments can have different and/or other components than the ones described here, and that the functionalities can be distributed among the components in a different manner.

The datacenter generation module 220 includes instructions for creating datacenters on the cloud platform. The software release management module 230 includes instructions for deploying software releases for various services or applications running on the datacenters created by the datacenter generation module 220.

Figure 4:
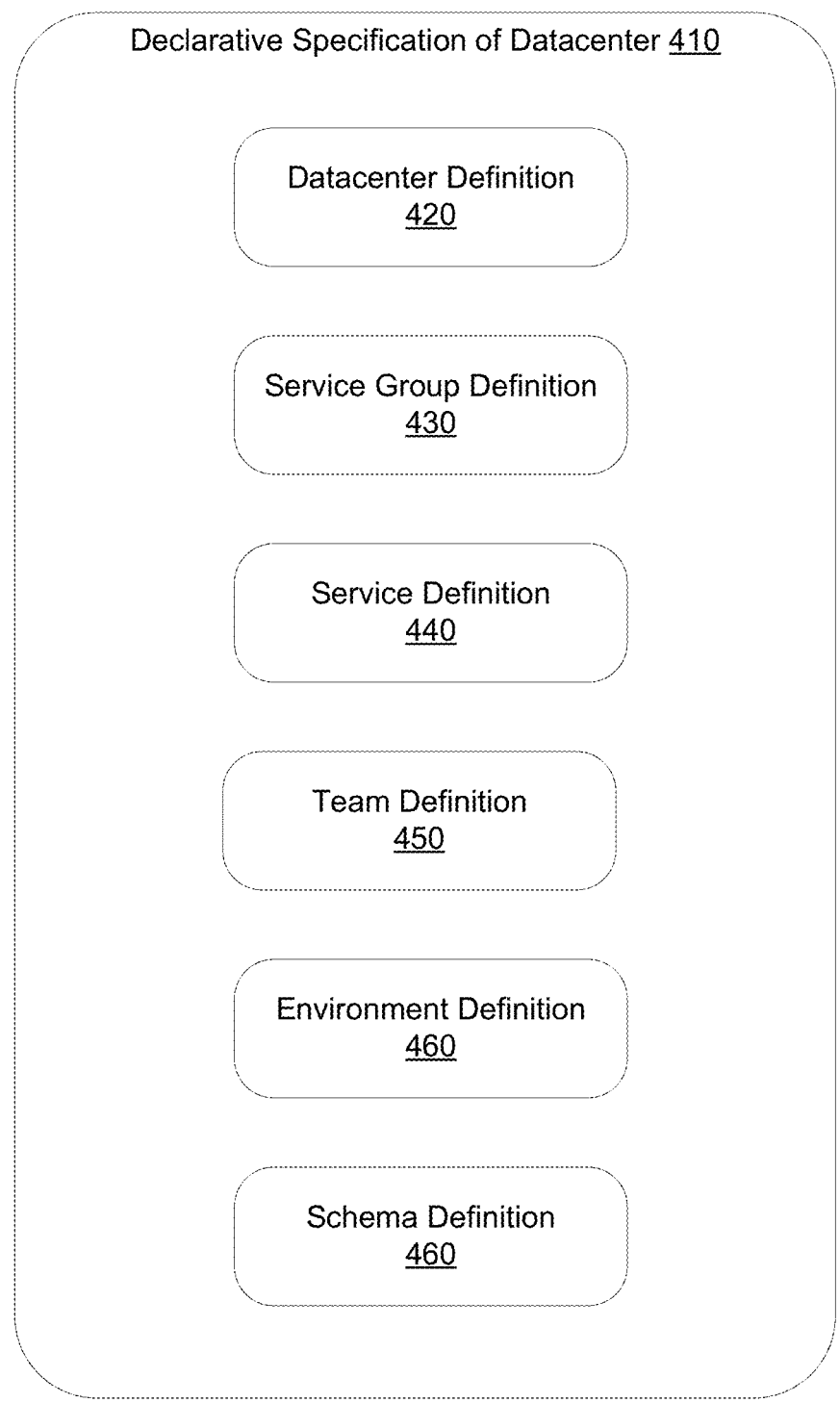
FIG. 4 illustrates an example of a datacenter declarative specification according to one embodiment.

The datacenter generation module 220 receives from users, for example, users of a tenant, a cloud platform independent declarative specification of a datacenter. The cloud platform independent declarative specification of a datacenter specifies various entities of the datacenter. In an embodiment, the cloud platform independent declarative specification of a datacenter comprises a hierarchical organization of datacenter entities, where each datacenter entity may comprise one or more services, one or more other datacenter entities or a combination of both. FIG. 4 describes various types of datacenter entities in further detail. The datacenter generation module 220 receives the platform independent declarative specification and a target cloud platform as input and generates a cloud platform specific metadata representation for the target cloud platform. The datacenter generation module 220 deploys the generated cloud platform specific metadata representation on the target cloud platform to create a datacenter on the target cloud platform according to the declarative specification.

The software release management module 230 receives as inputs (1) a version map 225 and (2) a master pipeline 235. The version map 225 identifies specific versions of software releases or deployment artifacts that are targeted for deployment on specific datacenter entities. The version map 225 maps datacenter entities to software release versions that are targeted to be deployed on the datacenter entities. The master pipeline 235 includes instructions for operations related to software releases on the datacenter, for example, deployment of services, destroying services, provisioning resources for services, destroying resources for services, and so on.

The master pipeline 235 may include instructions for performing operations related to software releases for different environments such as development environment, test environment, canary environment, and production environment, and instructions for determining when a software release is promoted from one environment to another environment. For example, if the deployments of a software release in a development environment execute more than a threshold number of test cases, the software release is promoted for test environment for further testing, for example, system level and integration testing. If the software release in a test environment passes a threshold of test coverage, the software release is promoted to canary environment where the software release is provided to a small subset of users on a trial basis. If the software release in a canary environment executes without errors for a threshold time, the software release is promoted to production environment where the software release is provided to all users.

The software release management module 230 compiles the input version map 225 and the master pipeline 235 to generate a cloud platform specific detailed pipeline 255 that is transmitted to the target cloud platform. The cloud platform specific detailed pipeline 255 includes instructions for deploying the appropriate version of a software release or deployment artifact on the datacenter entities as specified in the version map 225. The software release management module 230 may receive modifications to one of the inputs. For example, a user may modify the input version map 225 and provide the same master pipeline 235. Accordingly, the same master pipeline is being used but different software releases are being deployed on datacenter entities. The software release management module 230 recompiles the inputs to generate a new cloud platform specific detailed pipeline 255 that deploys the versions of software releases according to the new version map 225.

The version map may also be referred to as an artifact version map, a deployment manifest, a version manifest, a software release map, or a software version map. The master pipeline may also be referred to as a master deployment pipeline or a master orchestration pipeline. The version map or deployment manifest specifies information specific to a datacenter entity, for example, a particular software artifact version that should be used for the datacenter entity, values of parameters provided as input to a pipeline for that datacenter entity, types of computing resources to be used for that datacenter entity, specific parameter values for configuration of the computing resources for the datacenter entity, and so on.

Figure 2B:
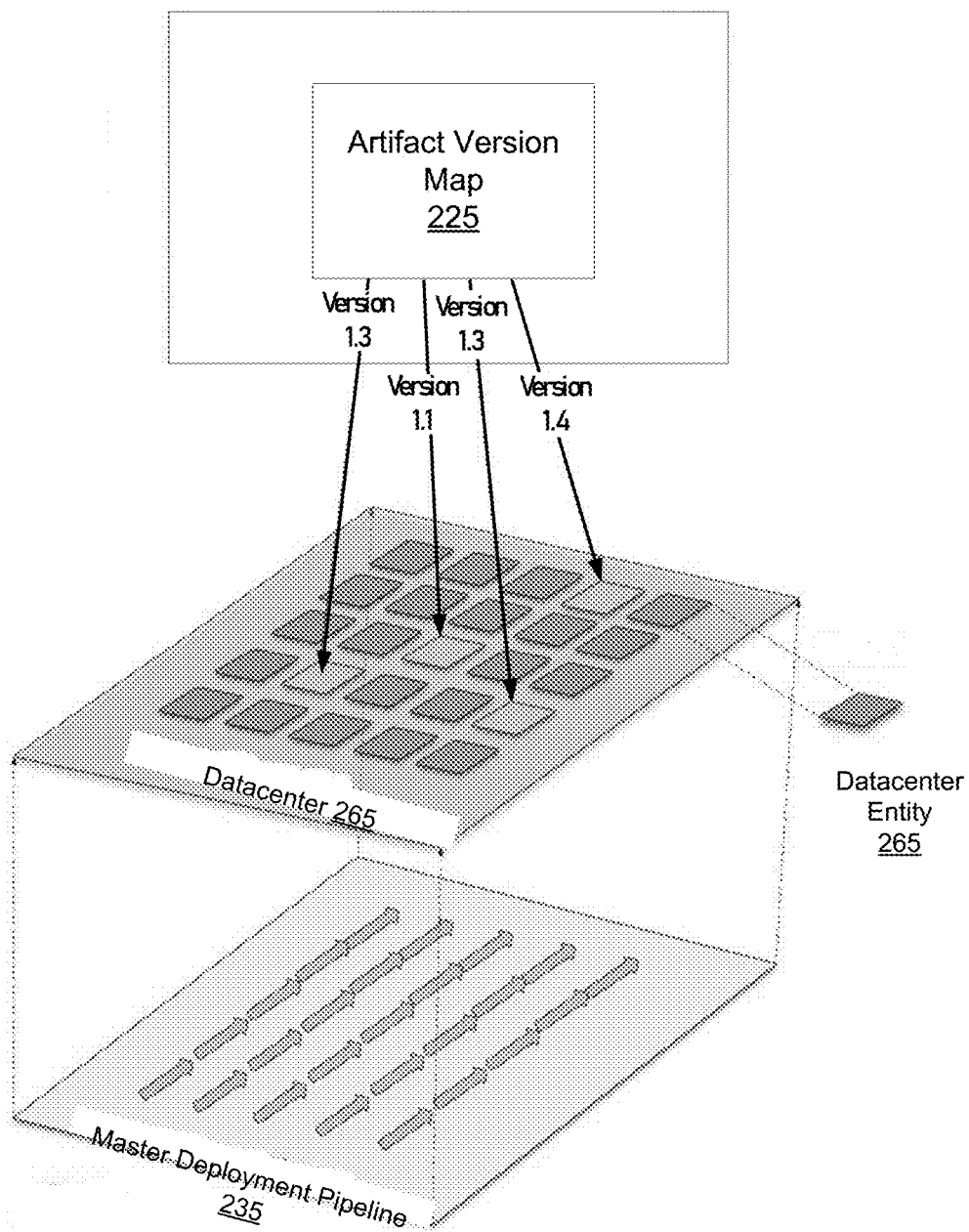
FIG. 2B illustrates the overall process for deploying software artifacts in a datacenter according to an embodiment.

FIG. 2B illustrates the overall process for deploying software artifacts in a datacenter according to an embodiment. FIG. 2B shows a layout of a datacenter 265 including various datacenter entities. As shown in FIG. 2B, the version map 225 identifies the different versions of software that are targeted for release on different datacenter entities 275 of the datacenter 265. The master pipeline represents the flow of deployment artifacts through the various environments of the datacenter. The software release management module 230 combines the information in the master pipeline 235 with the version map 225 to determine cloud platform specific detailed pipeline 255 that maps the appropriate version of software artifacts on the datacenter entities according to the version map 225.

Figure 3:
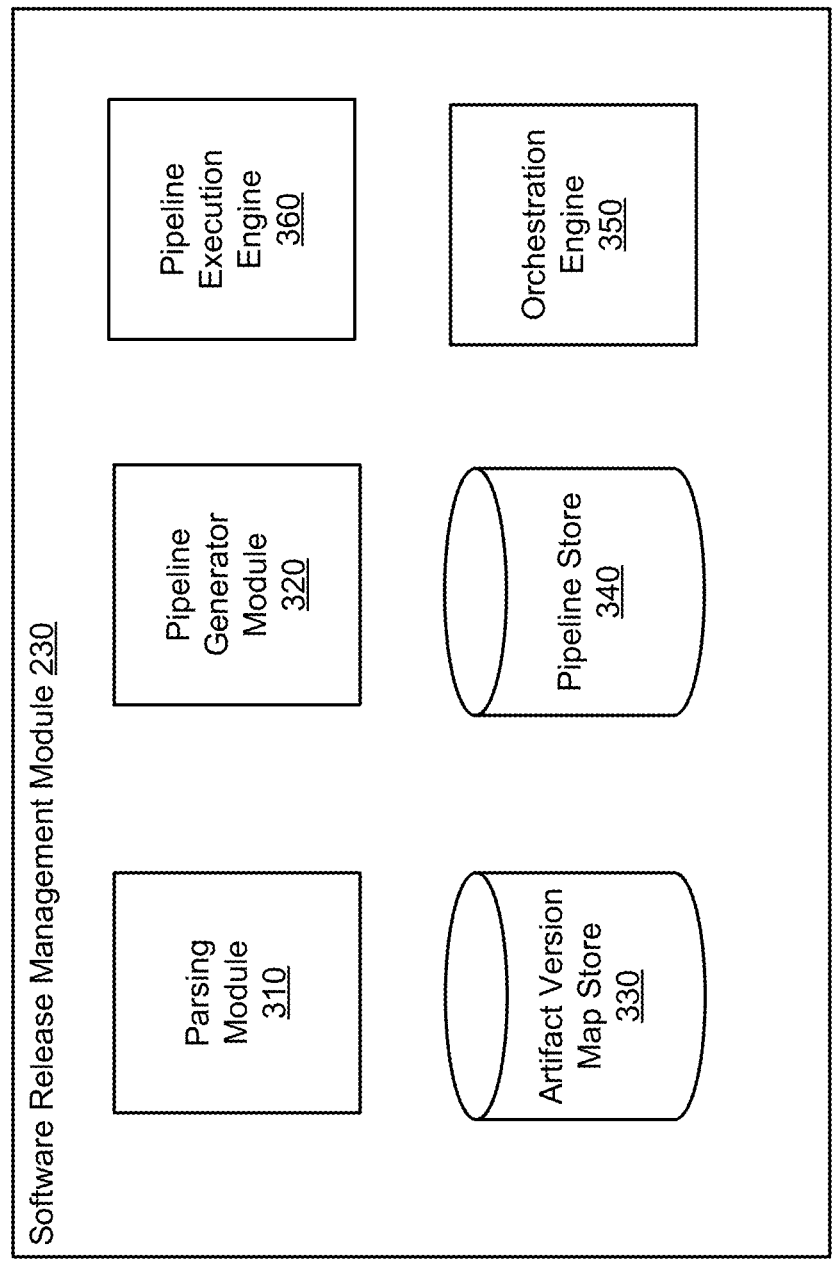
FIG. 3 is a block diagram illustrating the architecture of a software release management module according to one embodiment.

FIG. 3 is a block diagram illustrating the architecture of a software release management module 230 according to one embodiment. The software release management module 230 includes a parsing module 310, a pipeline generator module 320, a version map store 330, a pipeline store 340, and a pipeline execution engine 360. Other embodiments may include more, fewer, or different modules than those indicated herein in FIG. 3.

The parsing module 310 parses various types of user input including declarative specification of a datacenter, version map 225, and master pipelines 235. The parsing module 310 generates data structures and metadata representations of the input processed and provides the generated data structures and metadata representations to other modules of the software release management module 230 for further processing.

The metadata store 340 stores various transformed metadata representations of datacenters that are generated by the software release management module 230. The transformed metadata representations may be used for performing rollback to a previous version if an issue is encountered in a current version of the datacenter. The transformed metadata representations may be used for validation, auditing, governance, and so on at various stages of the transformation process.

The pipeline generator module 320 processes the master pipelines in conjunction with the version map received as input to generate a detailed pipeline for a target cloud platform. The pipelines comprise stages that include instructions for provisioning services or deploying applications for deploying versions of software releases for various services on the cloud platform according to the version map. The version map store 330 stores version maps received from users and the pipeline store 340 stores master pipelines as well as pipelines generated by the pipeline generator module 320.

The pipeline execution engine 360 executes the detailed pipelines generated by the pipeline generator module 320. In an embodiment, the pipeline execution engine 360 is a system such as SPINNAKER that executes pipelines for releasing/deploying software. The pipeline execution engine 360 parses the pipelines and executes each stage of the pipeline on a target cloud computing platform.

Figure 12:
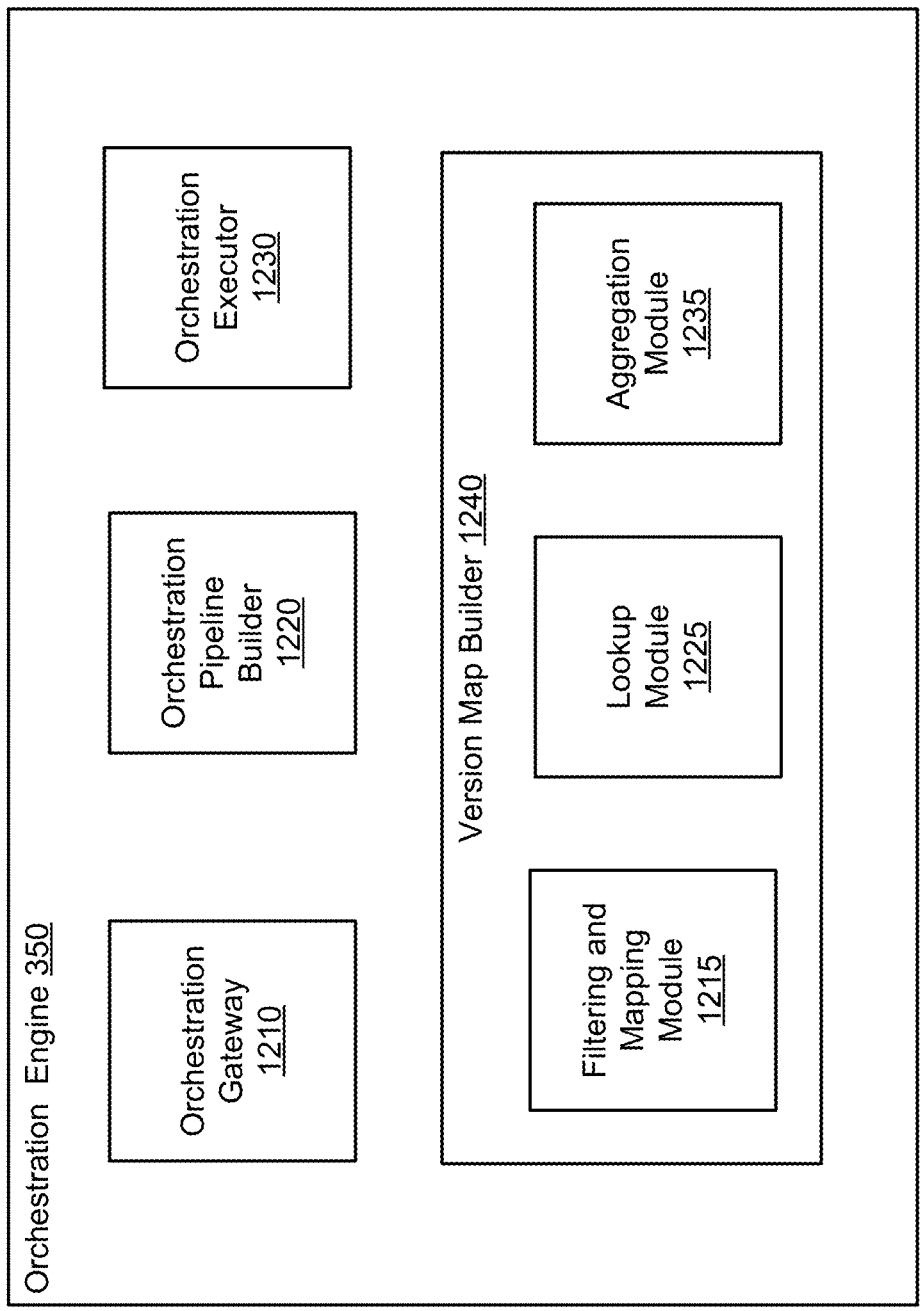
FIG. 12 shows the system architecture of the orchestration engine, according to an embodiment.

The orchestration engine 350 performs orchestration of the operations related to datacenters or datacenter entities on the cloud platforms including creation, destruction, and modification of the datacenters or datacenter entities. The orchestration engine 350 processes the declarative specification of a datacenter and uses the layout of the datacenter as defined by the declarative specification to generate pipelines for orchestration of operations associated with the datacenter. Details of the orchestration engine 350 are shown in FIG. 12 and described in connection with FIG. 12. Processes executed by the orchestration engine 350 are further described herein.

Cloud Platform-Based Datacenter Generation

FIG. 4 illustrates an example of a declarative specification of a datacenter according to one embodiment. The declarative specification 410 includes multiple datacenter entities. A datacenter entity is an instance of a datacenter entity type and there can be multiple instances of each datacenter entity type. Examples of datacenter entities include datacenters, service groups, services, teams, environments, and schemas.

The declarative specification 410 includes definitions of various types of datacenter entities including service group, service, team, environment, and schema. The declarative specification includes one or more instances of datacenters. Following is a description of various types of datacenter entities and their examples. The examples are illustrative and show some of the attributes of the datacenter entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 520 represents a set of capabilities and features and services offered by one or more computing systems that can be built and delivered independently, in accordance with one embodiment. A service group may be also referred to as a logical service group, a functional unit, a business unit, or a bounded context. A service group 520 may also be viewed a set of services of a set of cohesive technical use-case functionalities offered by one or more computing systems. A service group 520 enforces security boundaries. A service group 520 defines a scope for modifications. Thus, any modifications to an entity, such as a capability, feature, or service offered by one or more computing systems within a service group 520 may propagate as needed or suitable to entities within the service group, but does not propagate to an entity residing outside the bounded definition of the service group 520. A datacenter may include multiple service groups 520. A service group definition 430 specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a datacenter have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
  "service_group": [
    {
      "cells": [ ],
      "description": "Service group Service Instance Definitions",
      "service_group_id": "id1",
      "name": "name1",
      "schema_version": "1.0",
      "cluster_instances": [
        {
          "cluster_instance_name": "cluster1",
          "cluster_type": "cluster_type1"
        },
        {
          "cluster_instance_name": " cluster2",
          "cluster_type": " cluster_type1"
        },
        {
          "cluster_instance_name": " cluster3",
          "cluster_type": " cluster_type2"
        }
      ],
      "service_instances": [
        {
          "service_instance_name": "serviceinstance0001",
          "service_type": "servicetype1"
        },
```

-continued

```
        {
          "service_instance_name": "serviceinstance0002",
          "service_type": " servicetype1"
          "cluster_instance": "cluster1"
        },
        {
          "service_instance_name": "serviceinstance0003",
          "service_type": " servicetype2"
        },
        ...
      ],
      "service_teams": ["team1"],
      "type": "servicetype"
      "security_groups":[
        {
          "name":"group1",
          "policies":[
            {
              "description":"Allow access from site S1",
              "destination":{ "groups":[ "group2" ] },
              "environments":[ "dev", "test", "staging" ],
              "source":{
                "iplist":"URL1",
                "filters":[ filter-expression ]
              }
            }
          ]
        }
      ]
    }
  ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the datacenter deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the datacenter generation module generates instructions for the cloud platform that implement specific network policies using cloud platform specific features and network functionality such that the network policies implement the security policies specified in the declarative specification.

A datacenter entity called a cell represents a set of services that interact with each other in a vertical fashion and can be scaled by additional instances or copies of the cell, i.e., copies of the set of services. Creating multiple instances of a cell allows a system to scale a set of services that interact with each other. A datacenter instance may include one or more cells. Each cell may include one or more services. A datacenter may include instances of service groups or cells.

A service definition 440 specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the datacenter can interact with a service via the ports specified by the service.

The service definition 440 specifies an attribute outbound access that specifies destination endpoints, for example, external URLs (uniform resource locators) specifying that the service needs access to the specified external URLs. During deployment, the datacenter generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
  "service_definition": [
  {
    "authorized_clients": [ ],
    "build_dependencies": [ ],
```

-continued

```
    "description": "description of service",
    "dns_name": "dns1",
    "documentation": "URL",
    "name": "name1",
    "namespace": "space1",
    "service_owner": "user1",
    "service_status": "GA",
    "service_team": "team1",
    "support_level": "STANDARD",
    "start_dependencies": ["svc5", "svc7", ...],
    "sub_services": [ "service1", " service2", " service3", ... ],
    "listening_ports":[
            { "protocol":"tcp", "ports":[ "53" ] },
            { "protocol":"udp", "ports":[ "53" ] }
        "outbound_access":[
        {
           "destination":[
           {
             "endpoints":[ ".xyz.com:443", ".pqr.com:443" ]
           }
           ]
         }
        ],
    }
  ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a datacenter and is accordingly associated with all service groups within the datacenter. A team association specified at a datacenter level provides a default team for all the service groups within the datacenter and further provides a default team for all services within the service groups.

According to an embodiment, a team association specified at the functional level overrides the team association provided at the datacenter level. Similarly, a team association specified at the service level overrides the default that may have been provided by a team association specified at the service group level or a datacenter level. A team can decide how certain action is taken for the datacenter entity associated with the team. The team associations also determine the number of accounts on the cloud platform that are created for generating the final metadata representation of the datacenter for a cloud platform by the compiler and for provisioning and deploying the datacenter on a cloud platform. The datacenter generation module 210 creates one or more user accounts in the cloud platform and provides access to the team members to the user accounts. Accordingly, the team members are allowed to perform specific actions associated with the datacenter entity associated with the team, for example, making or approving structural changes to the datacenter entity or maintenance of the datacenter entity when it is deployed including debugging and testing issues that may be identified for the datacenter entity.

Conventional techniques associate the same team with the datacenter through out the design process thereby resulting in the organizational structure having an impact on the design of the datacenter or service group. Embodiments decouple the team definition from the constructions that define the datacenter entity, thereby reducing the impact of the teams on the design and architecture of the datacenter entity.

```
{
    "team definition": [
        "name": "team1",
        "description": "description of team",
        "admins": [
            "user1",
            "user2",
            "user3",
            "user4",
            ...
        ],
        "team_id": "id1",
        "owner": "owner_id",
        "email": "team1@xyz.com",
    }
    ],
    "communication_channel": "channel1"
    "schema_version": "1.0"
}
```

An environment definition 460 specifies a type of system environment represented by the datacenter, for example, development environment, staging environment, test environment, or production environment. A schema definition 470 specifies schema that specifies syntax of specific datacenter entity definitions. The schema definition 470 is used for validating various datacenter entity definitions. The datacenter generation module determines security policies for the datacenter in the cloud platform specific metadata representation based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A datacenter definition 420 specifies the attributes and components of a datacenter instance. A declarative specification may specify multiple datacenter instances. The datacenter definition 420 specifies attributes including a name, description, a type of environment, a set of service groups, teams, domain name servers for the datacenter, and so on. A datacenter definition may specify a schema definition and any metadata representation generated from the datacenter definition is validated against the specified schema definition. A datacenter includes a set of core services and capabilities that enable other services to function within the datacenter. An instance of a datacenter is deployed in a particular cloud platform and may be associated with a particular environment type, for example, development, testing, staging, production, and so on.

Following is a definition of a datacenter instance. The datacenter instance definition includes a list of service groups included in the datacenter instance and other attributes including an environment of the datacenter, a datacenter identifier, a name, a region representing a geographical region, one or more teams associated with the datacenter, and a schema version.

```
{
    "datacenter_instance": {
        "environment": "env1",
        "datacenter_instance_identifier": "id1",
        "name": "data_center1",
        "region": "region1",
        "service_groups": [
            "service_group1",
            " service_group2",
            " service_group3",
            "service_group4",
            ...
        ],
        "schema_version": "1.0",
        "admin team":"admins",
        ...
    }
  }
}
```

Figure 5:
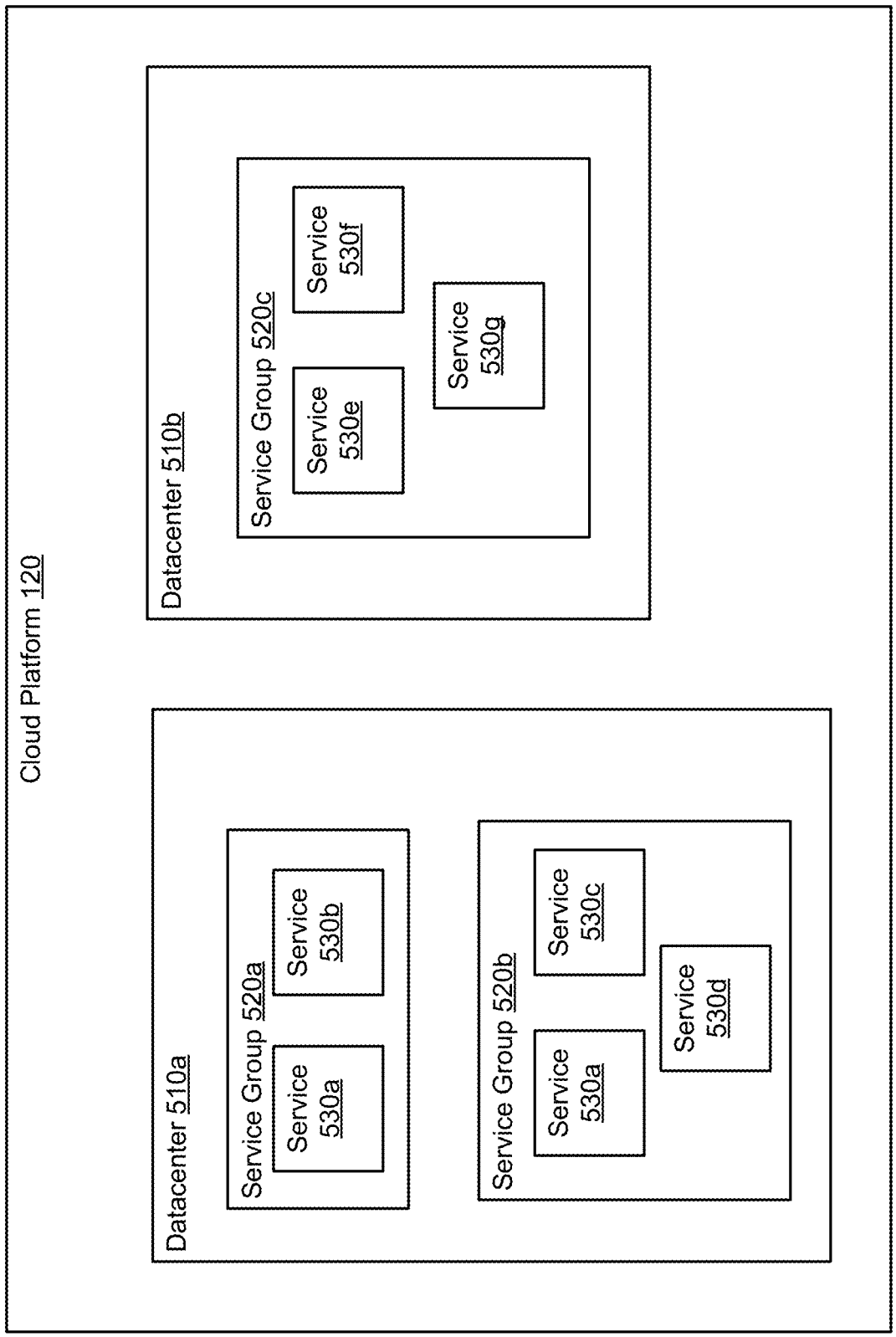
FIG. 5 illustrates example datacenters created on a cloud platform based on a declarative specification according to one embodiment.

FIG. 5 illustrates some example datacenters created on a cloud platform based on a declarative specification according to one embodiment. The datacenters 510 may be created based on a declarative specification processed by the datacenter generation module 210. As shown in FIG. 5, multiple datacenters may be configured within a cloud platform 120. Each datacenter 510 may correspond to a tenant 115 of a multi-tenant system 110. A tenant 115 may create one or more datacenters 510. Alternatively, a datacenter 510 may be created by any computing system. Each datacenter includes one or more service groups. For example, datacenter 510a includes service groups 520a and 520b and datacenter 510b includes service group 520c. A datacenter may include multiple instances of a particular type of service group. Each service group includes a set of services. For example, service group 520a includes services 530a and 530b, service group 520b includes services 530a, 530b, and 530c, and service group 520c includes services 530e, 530f, and 530g. A service group may include multiple instances of services of the same service type.

The datacenter generation module 220 creates datacenters on cloud platforms based on a declarative specification using the following steps. The datacenter generation module 210 receives a cloud platform independent declarative specification of a datacenter. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the datacenter is configured to generate the datacenter on any of a plurality of cloud platforms.

The datacenter generation module 210 receives information identifying a target cloud platform for creating the datacenter based on the cloud platform independent declarative specification. The target cloud platform could be any of a plurality of cloud platforms, for example, AWS, AZURE, GCP, and so on. The datacenter generation module 210 further receives information to connect with the target cloud platform, for example, credentials for creating a connection with the target cloud platform. A cloud platform may also be referred to as a cloud computing platform.

The datacenter generation module 210 compiles the cloud platform independent declarative specification to generate a cloud platform specific datacenter representation for creating the datacenter on the target cloud computing platform. For example, the cloud platform specific datacenter representation may refer to user accounts, network addresses, and so on that are specific to the target cloud computing platform.

The datacenter generation module 210 sends the platform specific datacenter representation along with instructions for deploying the datacenter on the target cloud computing platform. The target cloud computing platform executes the instructions to configure the computing resources of the target cloud computing platform to generate the datacenter according to the platform specific datacenter representation. The datacenter generation module 210 provides users with access to the computing resources of the datacenter configured by the cloud computing platform. For example, if the datacenter was created for a tenant of the multi-tenant system, users associated with the tenant are provided with access to the datacenter.

Figure 6:
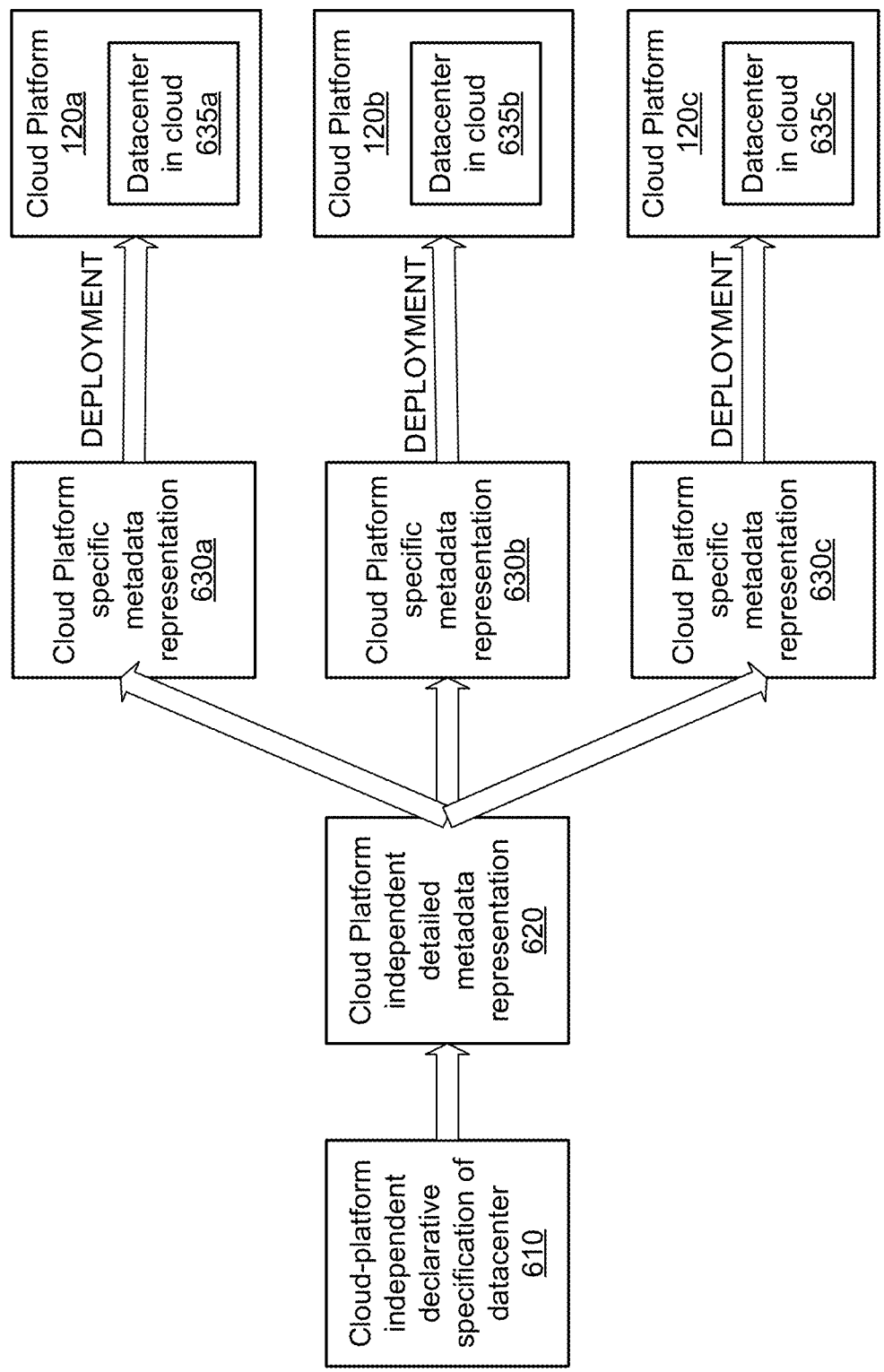
FIG. 6 is a block diagram illustrating generation of datacenters on cloud platforms based on a declarative specification, according to one embodiment.

FIG. 6 is a block diagram illustrating generation of datacenters on cloud platforms based on a declarative specification, according to one embodiment. The datacenter generation module 210 receives as input a cloud-platform independent declarative specification 610. The cloud-platform independent declarative specification 610 may be a version of the declarative specification that is being incrementally modified by users. The datacenter generation module 210 processes a particular version of the cloud-platform independent declarative specification 610. Since cloud-platform independent declarative specification 610 is not specified for any specific target cloud platform, the datacenter generation module 210 can configure a datacenter on any target cloud platform based on the cloud-platform independent declarative specification 610.

The datacenter generation module 210 processes the cloud-platform independent declarative specification 610 to generate a cloud-platform independent detailed metadata representation 620 for the datacenter. The cloud-platform independent detailed metadata representation 620 defines details of each instance of datacenter entity specified in the cloud-platform independent declarative specification 610. The datacenter generation module 210 creates unique identifiers for datacenter entity instances, for example, service instances.

In an embodiment, the cloud-platform independent detailed metadata representation 620 includes an array of instances of datacenter entity types, for example, an array of service group instances of a particular service group type. Each service group instance includes an array of service instances. A service instance may further include the details of a team of users that are allowed to perform certain actions associated with the service instance. The details of the team are used during provisioning and deployment by the datacenter generation module 210, for example, for creating a user account for the service instance and allowing members of the team to access the user account.

The cloud-platform independent detailed metadata representation 620 includes attributes of each instance of datacenter entity. Accordingly, the description of each instance of datacenter entity is expanded to include all details. As a result, the cloud-platform independent detailed metadata representation 620 of a datacenter may be significantly larger than the cloud-platform independent declarative specification 610. For example, the cloud-platform independent declarative specification 610 may be few thousand lines of specification, whereas the cloud-platform independent detailed datacenter representation 620 may be millions of lines of generated code. As a result, the datacenter generation module 210 keeps the cloud-platform independent detailed metadata representation 620 as immutable, i.e., once the representation is finalized, no modifications are performed to the representation. For example, if any updates, deletes, or additions of datacenter entities need to be performed, they are performed on the cloud platform independent declarative specification 610.

The datacenter generation module 210 receives a target cloud platform on which the datacenter is expected to be provisioned and deployed and generates a cloud platform specific detailed metadata representation 630 of the datacenter. For example, the datacenter generation module 210 interacts with the target cloud platform to generate certain entities (or resources), for example, user accounts, virtual private clouds (VPCs), and networking resources such as subnets on the VPCs, various connections between entities in the cloud platform, and so on. The datacenter generation module 210 receives resource identifiers of resources that are created in the target cloud platform, for example, user account names, VPC IDs, and so on, and incorporates these in the cloud-platform independent detailed metadata representation 620 to obtain the cloud platform specific metadata representation 630 of the datacenter. In an embodiment, the datacenter generation module 210 creates one unique user account on the cloud platform for each team for a given combination of a service group and a service. The user account is used by the team for performing interactions with that particular service for that service group, for example, for debugging, for receiving alerts, and so on.

The target cloud platform may perform several steps to process the cloud-platform specific detailed metadata representation 630. For example, the cloud platform independent declarative specification may specify permitted interactions between services. These permitted interactions are specified in the cloud-platform specific detailed metadata representation 630 and implemented as network policies of the cloud platform. The cloud platform may further create security groups to implement network strategies to implement the datacenter according to the declarative specification.

The cloud platform independent declarative specification specifies dependencies between services, for example, start dependencies for each service listing all services that should be running when a particular service is started. The datacenter generation module 220 generates the cloud platform specific detailed metadata representation of the datacenter that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The datacenter generation module 220 creates trust relationships between user accounts that allow services to access other services via secure communication channels. These trust relationships are generated using substrate specific instructions generated based on the declarative specification, for example, based on outbound access attributes specified for services. The datacenter generation module 220 sends instructions to the cloud platform to create network policies based on cloud platform specific mechanisms that control the interactions and access across service groups and services, for example, as specified by the constructs of the declarative specification such as outbound access, security groups, security policies and so on.

The datacenter generation module 210 deploys the cloud platform specific metadata representation 630 on the specific target cloud platform for which the representation was generated. The datacenter generation module 210 may perform various validations using the generated metadata representations, including policy validations, format validations, and so on.

The cloud platform independent declarative specification 610 may be referred to as a declared datacenter representation, cloud-platform independent detailed metadata representation 620 referred to as a derived metadata representation of the datacenter, and cloud platform specific metadata representation 630 referred to as a hydrated metadata representation of the datacenter.

Overall Process for Deployment of Software Artifacts on a Datacenter

FIG. 7 shows the overall process for generating pipelines for deployment of software artifacts on datacenters configured on a cloud platform according to an embodiment. The datacenter generation module generates 710 one or more datacenters on a target cloud platform. Each datacenter is generated from a cloud platform independent declarative specification and has a hierarchy of datacenter entities.

The software release management module 230 generates 720 a cloud platform independent master pipeline. In an embodiment, the cloud platform independent master pipeline includes stages corresponding to environments of the datacenters, for example, development environment, test environment, canary environment, and production environment. The master pipeline composes a sequence of progressive and/or conditional deployment across various environments such as development environment, test environment, staging environment, or production environment. The master pipeline may be triggered by delivery of the image for a software artifact and includes stages or instructions to deploy the build in environments of type development. The software artifact that is built is conditionally promoted to one or more test environments, followed by one or more canary environments before eventually getting deployed to production environments. The master pipeline may be customized by users, for example, service owners to represent a specific orchestration across environments. The master pipeline may be customized to capture specific promotion criteria for moving from one stage to next. For example, different tenants of the multi-tenant system may customize the master pipeline in a different manner. In an embodiment, the master pipeline by default uses the latest version of software for a software artifact for a service and builds and deploys the version across various environments. The user can use the version map to ensure that a specific version of a software artifact is deployed on specific datacenter entities.

In an embodiment, each service deployed in the datacenter has a cloud platform independent master pipeline generated from the datacenter entities as defined by the declarative specification of the datacenter, for example, master pipeline for datacenter instances, master pipeline for service groups, master pipeline for cells, master pipeline for services, and so on. The master pipelines may be triggered by delivery of images of software artifacts. The master pipelines may implement a service owner-controlled continuous deployment. The master pipelines may implement datacenter instance owner-owned or release owner-owned on-demand deployment.

Certain portions of the master pipeline may be customized by the users, for example, by tenants of a multi-tenant system that are deploying services on a datacenter. For example, the promotion decision pipeline may be customized by a tenant to determine which test cases are executed and what the threshold is. The software release management module 230 receives 730 customizations to logic for promoting a software artifact from one stage to another stage of the cloud platform independent master pipeline.

The software release management module 230 compiles 740 the cloud platform independent master pipeline to generate a cloud platform specific detailed deployment pipeline that is specific to the hierarchy of datacenter entities of each datacenter as specified by the cloud platform independent declarative specification for the datacenter.

The software release management module 230 further receives 750 code for releasing one or more features of services deployed on the datacenter. The software release management module 230 executes 760 the cloud platform specific detailed deployment pipeline to deploy software artifacts based on the received code.

Figure 8:
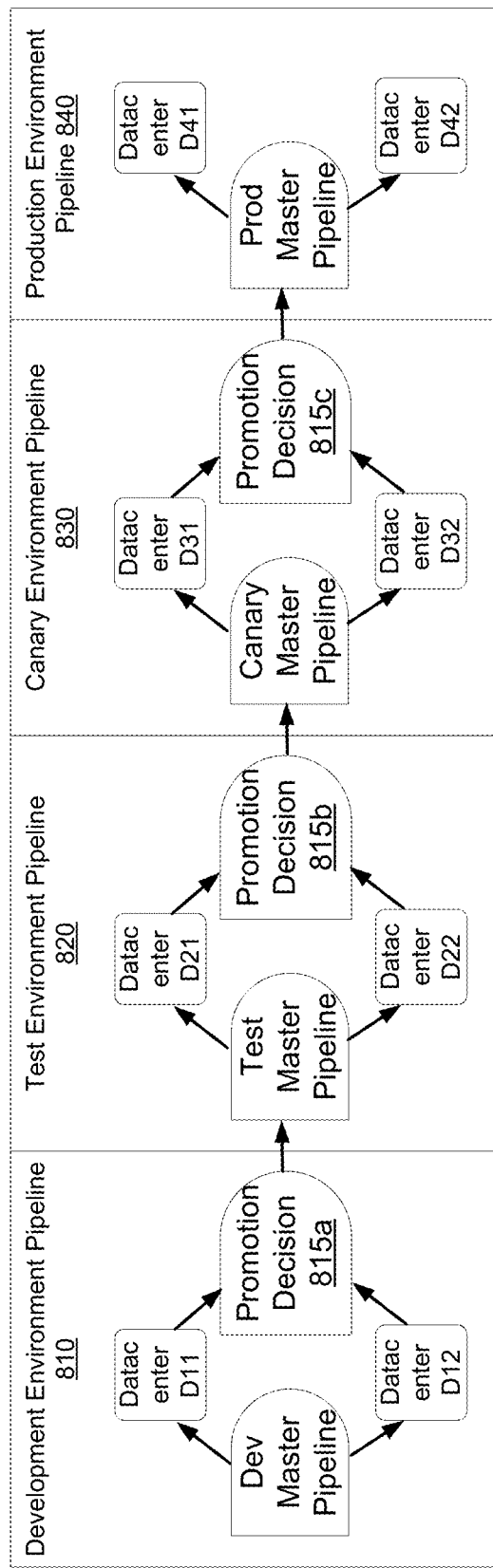
FIG. 8 illustrates an example master pipeline according to an embodiment.

FIG. 8 illustrates an example master pipeline 800 according to an embodiment. A master pipeline represents a sequence of stages that represent progressive conditional deployment across various datacenter environments. FIG. 8 shows stages for different environments of datacenter including development environment, test environment, canary environment, and production environment. Each stage further represents a pipeline that is executed for that stage. Accordingly, the master pipeline 800 includes a development environment pipeline 810 which feeds into a test environment pipeline 820, which feeds into a canary environment pipeline 830, which feeds into production environment pipeline 840.

The pipeline at each stage is a hierarchical pipeline comprising lower level pipelines. For example, the development environment pipeline 810 comprises a development master pipeline that feeds into datacenter pipelines D11, D12, . . . , depending on the number of datacenters specified as having development environment in the declarative specification of the datacenters.

The test environment pipeline 820 comprises a test master pipeline that feeds into datacenter pipelines D21, D22, . . . , depending on the number of datacenters specified as having test environment in the declarative specification of the datacenters.

The canary environment pipeline 820 comprises a canary master pipeline that feeds into datacenter pipelines D31, D32, . . . , depending on the number of datacenters specified as having canary environment in the declarative specification of the datacenters.

The production environment pipeline 820 comprises a production master pipeline that feeds into datacenter pipelines D21, D22, . . . , depending on the number of datacenters specified as having test environment in the declarative specification of the datacenters.

Each environment pipeline 810, 820, 830 includes a promotion decision pipeline 815a, 815b, 815c respectively. The outputs of the datacenter pipelines of the environment pipeline are collected by the promotion decision pipeline 815 that determines whether the software artifact is ready for promotion to the next stage. The promotion decision pipeline 815 may determine based on test case results obtained by the datacenters whether the software artifact for the service is promoted to the next stage. For example, if more than a threshold test cases are passed, the promotion decision pipeline 815 promotes the software artifact to the next stage. The last environment stage, for example, the production environment pipeline may not have a promotion decision pipeline since there is no subsequent stage to which the software artifact needs to be promoted. As shown in FIG. 8, the promotion decision pipeline 815a of development environment pipeline determines whether to promote the software artifact from development stage to test stage; the promotion decision pipeline 815b of test environment pipeline determines whether to promote the software artifact from test stage to canary stage, and the promotion decision pipeline 815c of canary environment pipeline determines whether to promote the software artifact from canary stage to production stage.

A master pipeline comprises multiple pipelines, for example, a provisioning pipeline for provisioning resources of the target cloud platform and a deployment pipeline for deploying a software artifact on a datacenter entity. Each pipeline comprises a sequence of stages, each stage representing one or more actions that need to be performed by the target cloud platform towards provisioning and deploying of the datacenter. The datacenter generation module 210 generates detailed pipelines for deploying versions of software artifacts on datacenter entities.

In an embodiment, the pipeline generator module 320 generates detailed pipelines using pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

In one embodiment, the pipeline generator module 320 generates pipelines in a hierarchical fashion based on the hierarchy of the datacenter entities of the datacenter. For example, the datacenter comprises datacenter entities of different types including datacenters, service groups, services, and so on. A datacenter entity may include one or more child datacenter entities. For example, a datacenter includes one or more service groups as child datacenter entities. A service group includes one or more services as child datacenter entities. Accordingly, the datacenter generation module 210 starts at a datacenter entity at a level of the hierarchy and generates pipelines of datacenter entities below that level. For example, the pipeline generator module 320 starts at the datacenter level and generates pipelines for service groups within the datacenter. For each service group, the pipeline generator module 320 generates pipelines for services within the service group.

The process for executing pipelines according to one embodiment is as follows. The software release deployment module 230 receives a request to deploy a software artifact on a set of datacenter entities in the target cloud platform. The software release deployment module 230 executes the master pipeline for one or more datacenters. The software release deployment module 230 executes the aggregate pipelines for each service group of each datacenter. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Figure 9:
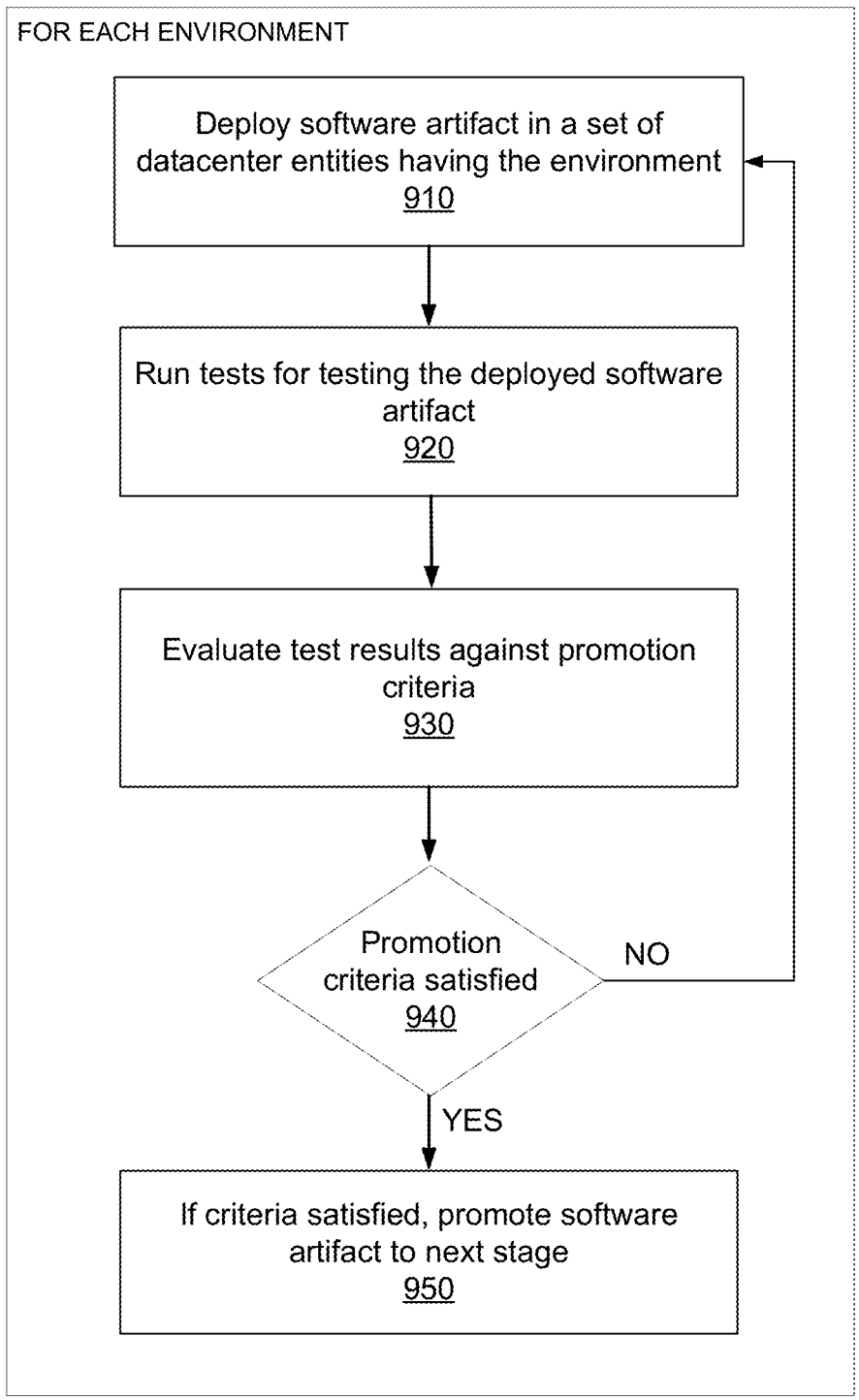
FIG. 9 shows the overall process executed by a stage for an environment of the master pipeline on a cloud platform according to an embodiment.

FIG. 9 shows the overall process executed by a stage for an environment of the master pipeline on a cloud platform according to an embodiment. The steps 910, 920, 930, 940, and 950 may be performed by each environment pipeline 810, 820, 830. The production environment pipeline 3 may execute only steps 910 and 920. The steps shown in FIG. 9 may be performed for one service or for multiple services specified using a manifest file.

The environment pipeline for an environment E includes instructions to deploy 910 the software on a set of datacenter entities, for example, a set of datacenter entities specified as having the environment E. In an embodiment, the software artifact is generated by compiling source code for a service. The source code may be obtained from a version control software. The set of datacenter entities may include datacenter instances, service groups, cells, services, or any combination of these.

The environment pipeline for the environment E further includes instructions for running 920 tests for testing the deployed software artifact on the set of datacenter entities. The environment pipeline for the environment E further includes instructions for evaluating 930 the test results against promotion criteria, for example, using the promotion decision pipeline 815. If the promotion criteria are not satisfied, the steps 910, 920, 930, and 940 may be repeated using a revised software artifact, for example, a software artifact generated from source code that includes fixes for certain defects identified during the testing 920. The environment pipeline for the environment E further includes instructions for proceeding 950 to the next stage if the promotion criteria are satisfied.

In an embodiment, the master pipeline comprises a hierarchy of pipelines. The hierarchy comprises multiple levels and pipelines at a particular level include pipelines of the next lower level as children pipelines. For example, at the highest level of hierarchy the master pipeline includes a release master pipeline that deploys a set of services related to a product. The next level of hierarchy includes service master pipelines that represent al deployments of a particular service across various environments. The next level of hierarchy may include service group master pipelines followed by service master pipelines.

Figure 10:
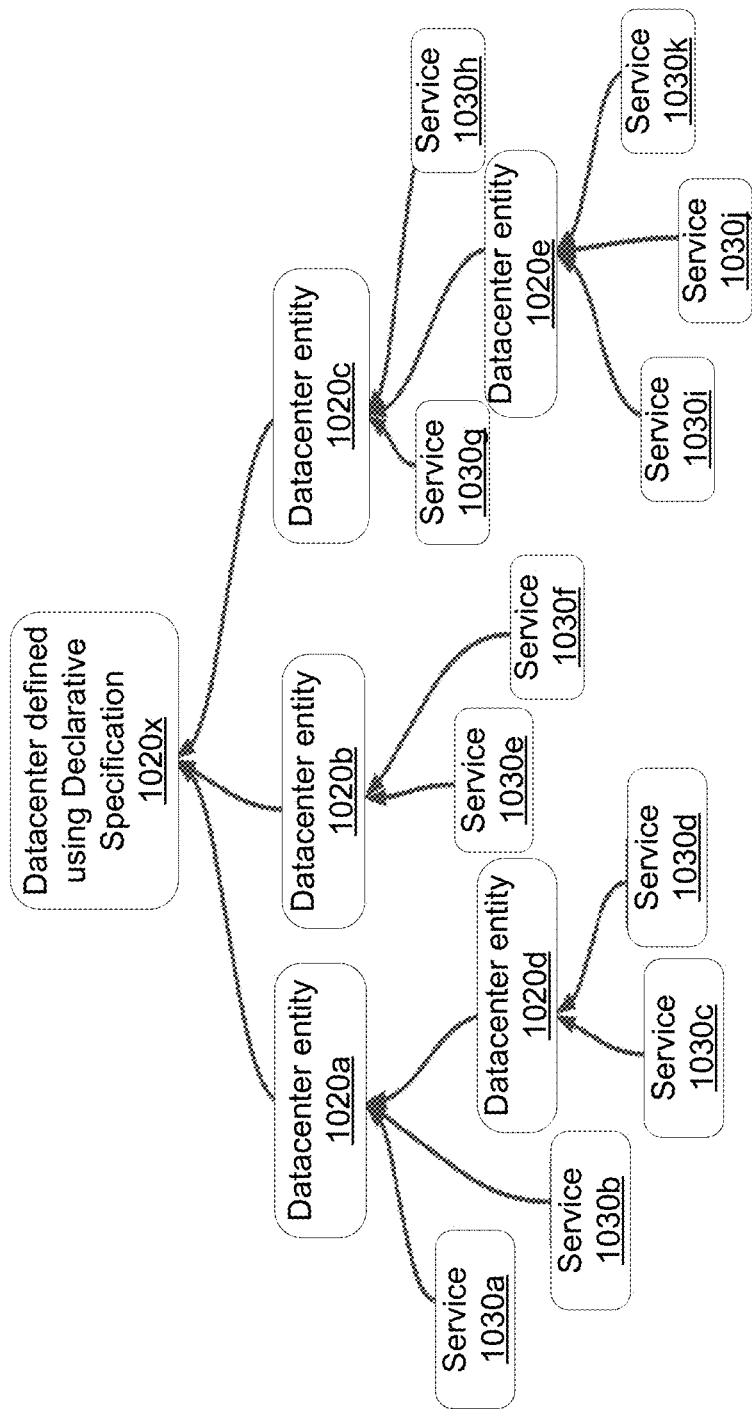
FIG. 10 shows an example datacenter configuration as specified using a declarative specification, according to an embodiment.

FIG. 10 shows an example datacenter configuration as specified using a declarative specification, according to an embodiment. The root node 1020x represents the datacenter that includes a hierarchy of datacenter entities. The datacenter entities 1020a, 1020b, 1020c, 1020d, 1020e may represent service groups (for example, functional domains). Each datacenter entity representing a service group comprises one or more services. For example, datacenter entity 1020d includes services 1030c and 1030d, datacenter entity 1020e includes services 1030i, 1030j, and 1030k, datacenter entity 1020b includes services 1030e, and 1030f, and so on. A datacenter entity may include services as well as other datacenter entities. For example, datacenter entity 1020a includes services 1030a, 1030b, and datacenter entity 1020d, datacenter entity 1020c includes services 1030g, 1030h, and datacenter entity 1020e, and so on. The system uses the declarative specification to determine the layout of the datacenter (as a blueprint of the datacenter) being created to guide the process of orchestration of the creation of the datacenter. For example, the system creates pipelines for creation datacenter entities and for creation of individual services based on the declarative specification.

Figure 11:
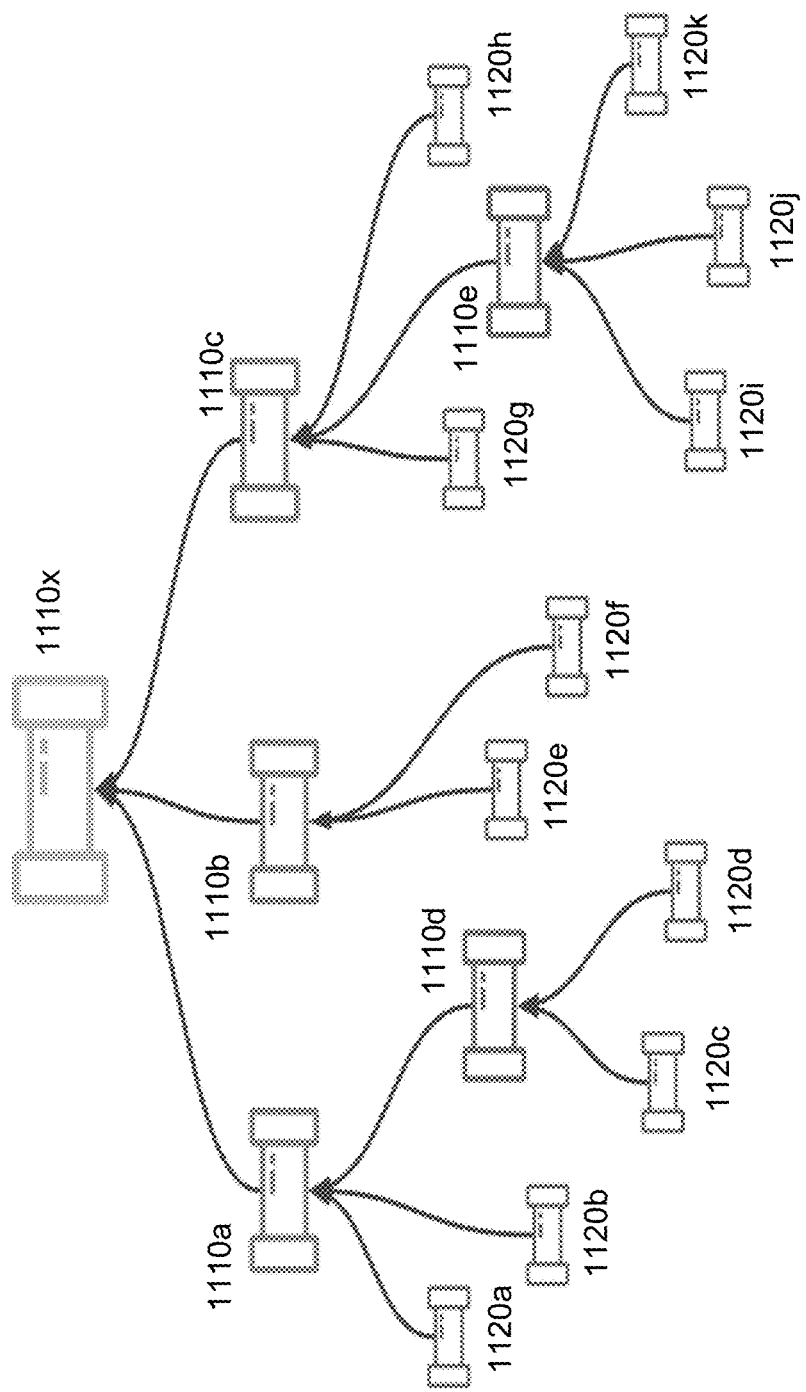
FIG. 11 shows an example master pipeline according to an embodiment.

FIG. 11 shows an example aggregate pipeline generated for creating a datacenter based on a declarative specification, according to an embodiment. For example, FIG. 11 shows an aggregate pipeline that represents a hierarchy of pipelines that corresponds to the hierarchy of datacenter entities defined in the declarative specification of FIG. 10. The pipeline structure shown in FIG. 11 includes a pipeline corresponding to each datacenter entity of the datacenter specified by the declarative specification, for example, the datacenter shown in FIG. 10. The system receives information identifying pipelines for individual services from service owners. For example, the service owner may either provide the pipeline for the service or provide a link to a location where the pipeline is stored. The pipelines for services received from the service owners are also referred to as unit pipelines. For example, the pipelines 1120a, 1120b, 1120c, . . . , and so on are unit pipelines for individual services. Each unit pipeline may be executed to configure the corresponding service on the cloud platform. The system generates aggregate pipelines 1110 that group individual service pipelines. For example, aggregate pipeline 1110a corresponds to datacenter entity 1010a, aggregate pipeline 1110b corresponds to datacenter entity 1010b, aggregate pipeline 1110d corresponds to datacenter entity 1010d, and so on. The system generates an aggregate pipeline 1110x for the entire datacenter 1020x. When all services and datacenter entities under a parent datacenter entity are configured (for example, the services are configured and running) the parent datacenter entity gets configured. A pipeline that is not a leaf level pipeline and has one or more child pipeline is an aggregate pipeline that orchestrates executions of the child pipelines.

The pipeline for the datacenter may be referred to as a master pipeline. The master pipeline is a hierarchical pipeline where each stage of a pipeline may comprise a pipeline with detailed instructions for executing the stage. The master pipeline hierarchy may mirror the datacenter hierarchy. For example, the top level of the master pipeline represents a sequence of stages for different environments. Each environment may include one or more pipelines for datacenter instances or pipelines for other types of datacenter entities. A datacenter instance pipeline 1010 may include service group pipelines 1020. Each service group pipeline 1020 may include one or more service pipelines 1030. A datacenter instance pipeline 1010 may include one or more service pipelines 1030. The service pipeline 1030 may comprise stages, each stage representing a pipeline representing instructions for deploying the service for specific environments. The lowest level pipeline or the leaf level pipeline in the hierarchy is referred to as a unit pipeline and may include detailed service specific instructions for performing an operation related to a service. For example, deployment for a service may include pre-deployment steps, deployment steps, post deployment steps, and post deployment test and validation step. A pipeline that is not a leaf level pipeline and has one or more child pipeline is an aggregate pipeline that orchestrates executions of the child pipelines.

A master pipeline may be driven by pull requests that occur in a version control system for software receives a request for considering changes committed to an external repository for inclusion in a project's main repository. Accordingly, the master pipeline is automatically triggered when a pull request is received and deploys a software artifact based on the latest software version for which the pull request is received. The master pipeline performs continuous delivery of software artifacts based on pull requests. The master pipeline may be driven based on an on-demand manner, for example, by invoking a request using application programming interface (API) of the deployment module 210. The on-demand deployment based on master pipelines may be requested for any set of services and for any version for a given service as specified using the API. The master pipeline may be invoked to request a rollback from the current version to a previous version or a rollforward from the currently deployed version to a more recent version.

In an embodiment, the deployment module 210 creates a service master pipeline for each service. These pipelines get triggered when a pull request is received for a repository of the software. The deployment module 210 receives pipeline templates from service owners for specific services. These pipeline templates include detailed instructions for testing, validation, build, etc. for specific services.

The pipeline generator creates all pipelines for each datacenter from the templates and combines them via master pipelines in a hierarchical fashion. In an embodiment, the pipeline generator generates service pipelines for individual services; the pipeline generator generates service group master pipelines to invoke service pipelines; the pipeline generator generates datacenter instance master pipelines to invoke service group pipelines.

Version Map

The deployment module 210 receives a version map that specifies versions of software artifacts and pipelines to be used for specific datacenter entities when certain operations are performed on a datacenter such as provisioning of resources and deploying of services. The version map defines which instances and versions of various entities are used for a deployment, for example, software artifacts, service pipelines specified by service owners for specific services, and so on. The version map provides a declarative specification of the specific versions of software artifacts that need to be deployed for services in different datacenter entities. Each datacenter entity may be uniquely identified based on its location within the datacenter hierarchy as specified by the declarative specification of the datacenter. For example, for a service, a software library may act as a software artifact. The software artifact may have multiple versions, for example, V1, V2, V3, and so on. The version map may specify that version V1 needs to be deployed in datacenter entities C1 and C2 and version V2 needs to be deployed in datacenter entities C3 and C4. The deployment module 210 generates master pipelines and instructions that ensure that the appropriate software artifact versions are deployed in the datacenter entities as specified in the version map.

In an embodiment, the version map is specified as a JSON (Javascript object notation) file, a YAML file, or a file using any other syntax for representing nested objects. The version map may comprise a set of <service>: <version> key pairs that are associated with various datacenter entities distributed across a hierarchy of a datacenter. The version map key pairs act as whitelists for corresponding pipelines. If a key for a service is not included into a version map, all pipelines for that service are excluded during execution of the pipeline. Different version maps may be applied to the same master pipeline resulting in different services being included/excluded during execution of the master pipeline.

Following is an example version map. The version map specifies environment types using the attribute "env_types".

In the following example, the environment type development is specified. The environment type may include one or more datacenter instances; a datacenter instance may include one or more service groups, a service group may include one or more services. In the following example, the software artifact name is specified as library1 and version as version1 and is associated with the service instance instance001. However, the software artifact name and version may be associated with any level of datacenter entity in the hierarchy. For example, of the software artifact name and version is specified or a service group, the software artifact name and version is applicable to all services within the service group unless the software artifact name and version is overridden with different values of the software artifact name and version specified for a particular service instance within the service group. Similarly, the software artifact name and version can be specified for a datacenter instance and is applicable to all service groups or cells within the datacenter instance unless an overriding value is specified for a service group.

```
{
    "name": "artifact_version_map1",
    "schema_version": "0.1",
    "release_label": "release1.1",
    "deployments": {
      "env_types": [
        {
          "name": "development",
          "datacenter_instances": [
            {
              "name": "datacenter1",
              "service_group": [
                {
                  "name": "service_group1",
                  "services": [
                    {
                      "service_instance": "instance001",
                      "name": "service1",
                      "versions": [
                        {
                          "software_artifact_name": "library1",
                          "version": "version1"
                        }
                      ]
                    }
                  ]
                }
              ]
            }
          ]
        }
      ],
    }
}
```

In an embodiment, the version map specifies a datacenter entity using a full path of the datacenter entity, for example, "stagger_group1/datacenter1/service_group2/service1". In an embodiment, the version map specifies a set of datacenter entities using regular expressions in the full path of the datacenter entity. For example, a full path that includes service_group[?] includes service_group1, service_group2, service_group3, and so on.

Following is an example of a version map specifying regular expressions to define a set of services. The environment types are specified as dev and test and the datacenter entities in the full path including datacenter instances and service groups are specified as wildcards and service instances are specified as "service*". Accordingly, for all datacenter instances for dev and test environments, for all service groups, for services names matching service*, the version V1 of application app 1 will be deployed.

```
env_types:
  - name: "dev | test"
    datacenter_instances:
      - name: "(.*)"
        service_group:
          - name: "(.*)"
            services:
              - service_instance: "service*"
                name: "app1"
                versions:
                  version: "V1"
```

In some embodiments, the version map may specify parameters used by pipelines. Accordingly, the specified parameters will be applicable to a stagger group for which the parameter is specified.

The system according to various embodiments allows service owners to list multiple version maps so that artifact versions and pipeline parameters can be referenced from different contexts (e.g., different environments) and for performing different operations. The service owner may specify different version maps for different environments, different service groups (e.g., datacenters, functional domains, and so on), and different service instances. The service owner may specify different version maps for different types of pipelines corresponding to different types of operations, for example, different version maps for provisioning or deployment pipelines. The service owner may specify a single version map that identifies multiple contexts where the version map is applicable, for example, multiple environments, service groups, environments, and so on.

System Architecture of Orchestration Engine

FIG. 12 shows the system architecture of the orchestration engine, according to an embodiment. The orchestration engine 350 includes an orchestration gateway 1210, an orchestration pipeline builder 1220, an orchestration executor 1230, and a version map builder 1240. Other embodiments may include more or fewer components than those shown in FIG. 12.

The orchestration gateway 1210 is the interface supported by the orchestration engine 350 to receive orchestration requests. The orchestration gateway 1210 intercepts orchestration requests from users and automated systems. In one embodiment, the orchestration gateway 1210 includes an authentication and authorization layer and MTLS (Mutual Transport Layer Security) capabilities to ensure only authenticated and authorized requests can trigger an infrastructure builds.

Orchestration requests can vary depending on the entities being built. An orchestration request may specify a single service deployment or deployment of an entire datacenter hosting multiple services and service groups. A request includes service names, datacenter, service groups, release version of declarative specification and the action that needs to be taken (for example, creation, destruction, modification). Once the request is received the orchestration gateway distinguishes targets previously built, targets being built or if there are any errors in previous deployment. If any of these conditions are met, the orchestration gateway may not take any action. If the received request does not belong to these conditions (targets 'already built', targets 'being built' or 'errors in deployment') then the orchestration gateway identifies the datacenter entities and services that needs to be built and schedules a request for the executor to execute the request. Following is an example request.

```
{
    "user": {
        "name": "user1",
    }
    "target": {
        "datacenter": "datacenter1",
        "business_unit": "commerce_cloud",
        "services": "svc1, svc2, svc3, svc4"
    }
    "action" : "create | teardown",
    "declarative_spec_version": "123"
    }
}
```

The orchestration pipeline builder 1220 generates workflows and pipelines for orchestrating various processes such as creation, destruction, or modification of datacenters and datacenter entities. The orchestration executor 1230 performs the actions for execution of any of the orchestration actions such as creation, destruction, or modification of datacenters and datacenter entities.

The version map builder 1240 builds an aggregate version map for an operation or a set of operations being performed on a datacenter configured on a cloud platform. The system allows users to specify multiple version maps for any service and the version map builder 1240 selects the best matching version maps for use during a particular deployment or provisioning operation. The version map builder 1240 includes a filtering and mapping module 1215, a lookup module 1225, and an aggregation module 1235.

The version map builder 1240 receives a declarative specification of a datacenter that is being configured. The datacenter may already have been configured and the declarative specification represents a target configuration such that the system is requested to modify the datacenter configuration to match the declarative specification. The deployment module 210 generates a cloud-platform independent detailed metadata representation based on the declarative specification. The filtering and mapping module 1215 compares the target configuration as specified by the cloud-platform independent detailed metadata representation with the existing configuration of the datacenter to determine the changes that need to be made to the datacenter. The version map builder 1240 identifies the best matching version maps to be used for performing the requested operations on the datacenter. There may be multiple version maps that may be applicable for each datacenter entity. The lookup module 1225 identifies all the relevant version maps that are applicable for each datacenter entity. The version map builder 1240 ranks all applicable version maps that are applicable and finds the best matching version map. The system uses the best matching version maps to perform the required operations to reconfigure the datacenter to match the target datacenter configuration corresponding to the declarative specification. The aggregation module 1235 generates an aggregate version map based on a set of best matching version maps that were identified for performing an operation on the datacenter.

A service owner specifies one or more version maps relevant to a service by providing service metadata. Following is an example of configuration file specifying the metadata for a service. The serviceMetadata object specifies attributes including adminTeam representing a team working on the service, a serviceName identifying the service, a serviceTypeID specifying a type of the service, a vmfRepo representing a path of a repository of version maps, and a set of vmfPaths representing locations of version maps relevant to the service within the repository.

```
serviceMetadata:
    adminTeam: team1
    serviceName: service1
    serviceTypeId: < UUID>
    vmfPaths:
        - dir1/production_manifest.yaml
        - dir2/stage_manifest.yaml
        - dir2/dev_manifest.yaml
    vmfRepo: dir3/vmfRepo1
```

A service owner can specify multiple version maps applicable to a service using the above service metadata format. The different version maps may be specified for different datacenter entities, for example, a version map M1 for a service group G1, a version map M2 for a service group G2, a version map M3 for a service instance S1, and so on. The version map builder 1240 identifies the best matching version maps from the set of version maps specified for each service.

Overall Process of Orchestration

Figure 13:
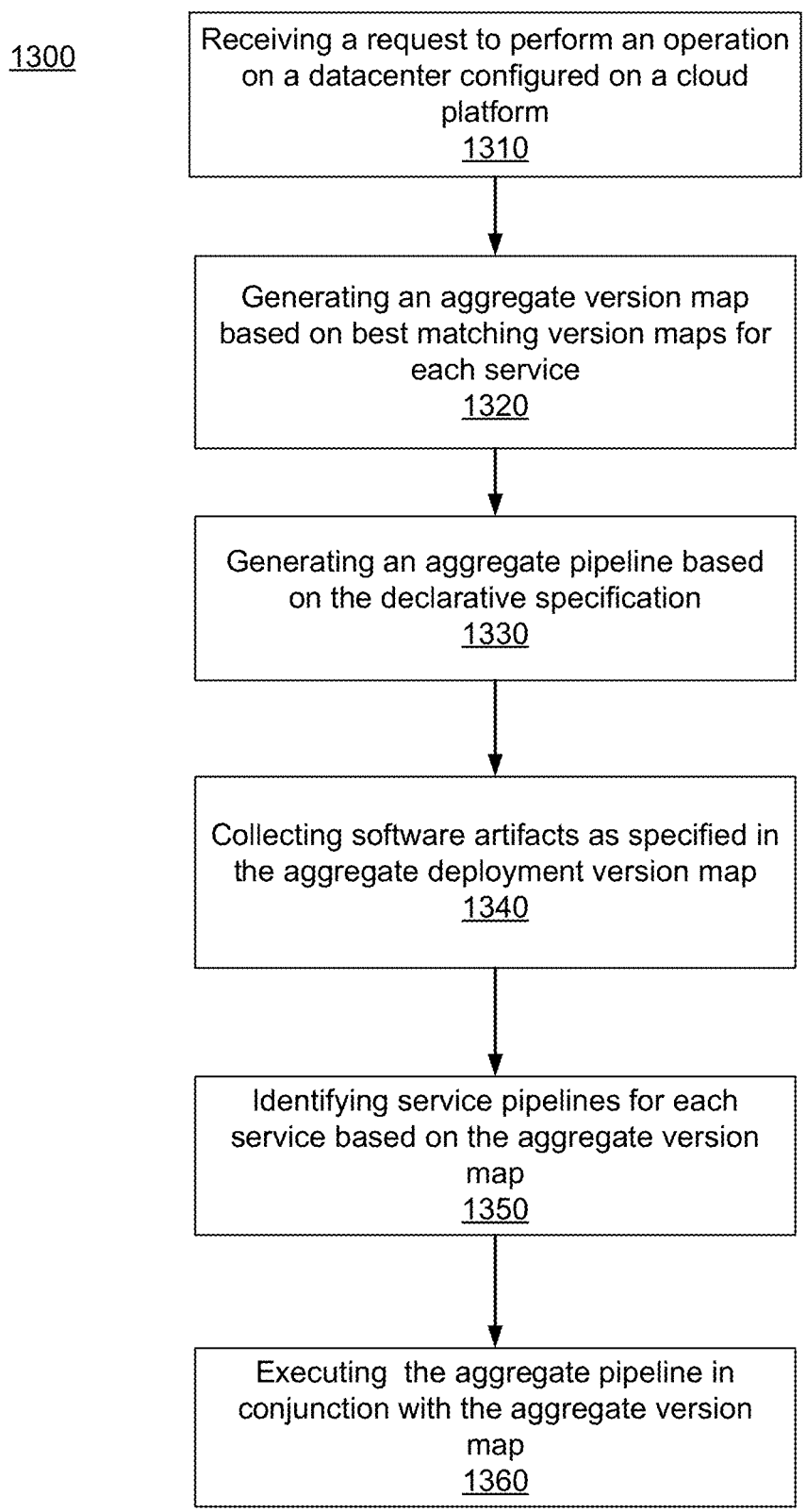
FIG. 13 shows a flowchart illustrating the process 1300 of performing operations on a datacenter configured on a cloud platform according to an embodiment.

FIGS. 13-14 show flowcharts illustrating various processes related to performing operations related to datacenters on cloud platforms. The steps of the various processes are indicated as being performed by a system, for example, the multi-tenant system 110 and the cloud platform 120. Some steps may be performed by the multi-tenant system 110 and some steps the cloud platform 120. The steps may be performed by various modules, for example, orchestration engine 350 of the software release management module 230 or by other modules indicated in FIG. 2, 3, or 12. Other embodiments can execute steps of the process shown in FIG. 13 in an order different from that shown in FIG. 13.

FIG. 13 shows a flowchart illustrating the process 1300 of performing operations on a datacenter configured on a cloud platform according to an embodiment.

The system receives 1310 a request to perform an operation on a datacenter configured on the cloud platform. According to an embodiment, the request is specified as a declarative specification representing a target configuration of the datacenter. The system generates a cloud-platform independent detailed metadata representation based on the declarative specification and compares the target configuration as specified by the cloud-platform independent detailed metadata representation with the existing configuration of the datacenter to determine the changes that need to be made to the datacenter. The system determines the operations to be performed to the datacenter based on the comparison. For example, if the target configuration includes a datacenter entity that is not currently available in the datacenter, the system includes an operation for creating the datacenter entity, if the target configuration does not include a datacenter entity that is currently available in the datacenter, the system includes an operation for deleting the existing datacenter entity, if the target configuration includes a datacenter entity with a configuration that is different from the configuration of a matching datacenter entity that is currently available in the datacenter, the system includes an operation for modifying the configuration of the existing datacenter entity.

The system generates 1320 an aggregate version map. The aggregate version map associates datacenter entities of the datacenter with versions of software artifacts targeted for deployment on the datacenter entities as well as versions of service pipelines to be used for specific services.

The system generates 1330 an aggregate pipeline based on the declarative specification and the aggregate version map. The aggregate pipeline comprises a hierarchy of pipelines including pipelines for performing various operations including creating datacenter entities, deleting datacenter entities, modifying configuration of datacenter entities and so on. The aggregate pipeline is configured to create the datacenter if the datacenter does not exist and to modify the configuration of the datacenter if it already exists. According to an embodiment, the system aggregates pipelines based on the datacenter hierarchy. The system uses the versions of the service pipelines as determined in the aggregate version map for including in the hierarchy of pipelines represented by the aggregate pipeline. The system uses the ordering of the individual pipelines, various pipeline parameters extracted from the declarative specification to build the aggregate pipeline. After ordering the service pipelines, the system aggregates all services defined for each service group (e.g., a business unit or functional domain). Within a service group, the system orders the pipelines based on the dependencies extracted from the declarative specification. The system further performs datacenter aggregation by ordering service groups.

According to an embodiment, the system determines pipeline ordering and dependency information from the declarative specification. The declarative specification includes start dependencies that specify other datacenter entities that depend on a particular datacenter entity. For example, the declarative specification may specify a set of services that need to be running in order for a particular service to be able to start. The system extracts these dependencies between datacenter entities. The system may store the dependencies as a dependency graph. The declarative specification may specify groupings of pipelines, for example, for strategic execution of pipelines or for optimized execution of pipelines. The system extracts information describing pipeline groupings. The declarative specification may specify ordering between datacenter entities for example, a datacenter entity D1 associated with a group G1 of the organization may need to be deployed before another datacenter entity D2 associated with group G2. For example, a datacenter entity associated with certain storage needs may have to be made available before any other datacenter entity is deployed. The system extracts the different types of information described above including start dependencies, pipeline grouping, and datacenter ordering from the declarative specification and incorporated the information in the aggregate pipelines generated for creation of the datacenter. The system determines pipeline and service ordering based on dependencies extracted from the declarative specification. During this step, the system performs pipeline ordering by topologically sorting the services based on the start dependencies that are defined for each service. The pipelines within each service are ordered according to the metadata extracted from the declarative specification and any dependencies specified by the service owner for that specific service. In an embodiment, the pipelines are ordered in the order specified by the dependencies between the services.

The system collects 1340 a set of software artifacts according to the aggregate deployment version map. Each software artifact in the set is associated with a datacenter entity of the datacenter being created. The version of the software artifact in the set of software artifacts is determined based on the aggregate version map and represents the best matching version of the software artifact that is applicable to the given context.

The system identifies 1350 the service pipelines of the best matching versions based on the aggregate version map. The matching service pipelines are associated with the aggregate pipelines so that the service pipelines are executed at the appropriate stage of the aggregate pipeline.

The system executes 1360 the aggregate pipeline in conjunction with the aggregate version manifest to create the datacenter in accordance with the declarative specification. The aggregate pipeline configures services of the datacenter based on the set of software artifacts.

According to an embodiment, the system may perform multiple iterations to create a datacenter based on a declarative specification. For example, a first attempt at creating the datacenter may succeed partially, thereby creating only a subset of the datacenter entities as specified in the declarative specification. Accordingly, during the second attempt, the system compares the configuration of the partially generated datacenter with the declarative specification to determine the set of operations that need to be performed to complete the process of configuration of the datacenter. If another failure occurs during the second attempt, the system repeats the process by performing more attempts until the configuration of the datacenter matches the declarative specification.

FIG. 14 shows the process of generating an aggregate version map, according to an embodiment. The process shown in FIG. 14 provides the details of the step 1320 of the process shown in FIG. 13. The process shown in FIG. 14 illustrates how the system selects the best matching version map for a particular service instance. The process shown in FIG. 14 is repeated for each service on which an operation is being performed to determine the corresponding best matching version map. The system generates the aggregate version map by aggregating the individual best matches of version maps determined for each service. In an embodiment, the system generates two aggregate version maps, a provision version map for provisioning services on the datacenter and a deploy version map for deploying services on the datacenter of the cloud platform.

The system receives 1410 a target service instance for which the best match version map needs to be determined and a list of input version maps. The target service instance may be specified by specifying the full path identifying the service instance 9 in a hierarchy of datacenter entities. For example, target service instance may be specified by specifying the environment type (development, test, production, etc.), and specifying the datacenter entities above the service instance in the hierarchy, for example, the datacenter, one or more service groups (e.g., a functional domain, a cell, and so on), and the service instance. The output of the process illustrated in FIG. 14 is the best match version map for the target service instance.

The system identifies 1420 the pipelines specified for the service instance including the provisioning pipelines and deployment pipelines. For example, the service owner may have specified multiple pipelines for provisioning and/or deploying different resources associated with the service. Examples of resources include clusters of servers used by the service instance, storage systems used by the service instance, database used by the service instance, queuing service used by the service instance, notification service used by the service instance, and so on. Each resource may have a provisioning pipeline associated with it that is specified for the target service instance by the service owners. There may be deployment pipelines, for example, pipeline for deploying a database, pipeline for deploying schema of the database, pipeline for deploying an application using the database, deploy code for each micro-service associated with the service instance, and so on. Each pipeline is identified by a unique identifier, for example, the location of the instructions (i.e., the template) of the pipeline in a storage repository. The identifiers of the pipelines are specified in the version map. Alternatively, the service definition may specify all the pipelines needed for provisioning/deploying the service instance.

The system builds 1430 a map M1 from pipelines to version maps associated with the pipelines. For example, if a particular version map specifies a set of pipelines, each pipeline is associated with the version map and is added to the map M1. The map M1 may be a hashmap that has a key based on the pipeline identifier.

The system initializes 1440 a map M2, for example, a hashmap that maps pipelines to a current best matching version map for the pipeline and a match rating for the current best matching pipeline. The map M2 may be initialized to an empty map data structure.

The system iterates through various pairs of pipelines and version maps stored in the map structure M1. For each pair (pipeline P, version map V) stored in the mat structure M1, the system performs steps 1450 and 1460. Accordingly for the version map V, the system determines 1450 a match rating R based on various criteria specified herein. If there is no current best match version map for the pipeline P stored in the map M2 so far, the version map M and the rating R are added to the map M2 for the key corresponding to the pipeline P. Assume that there is a current best matching version map $V_{current\_best}$ is stored for the pipeline P in the map M2 along with the match rating $R_{current\_best}$. In this situation, if the match rating R determined for the pipeline P indicates a better match of the version map V for the pipeline P compared to the match rating of the current best version map $V_{current\_best}$ stored in the map M2 for the pipeline P, the system replaces the entry $V_{current\_best}$ stored in the map M2 for pipeline P with V and replaces the match rating $R_{current\_best}$ with the rating R. If the match rating R determined for the pipeline P indicates a worse match of the version map V for the pipeline P compared to the match rating of the current best version map $V_{current\_best}$ stored in the map M2 for the pipeline P, the system ignores the version map V and leaves the entry $V_{current\_best}$ stored in the map M2 along with the corresponding match rating $R_{current\_best}$.

The above steps 1450 and 1460 are repeated for all pairs (pipeline, version map) stored in the map M1. Once all pairs (pipeline, version map) stored in the map M1 are processed, the system generates 1470 an aggregate version map based on the version maps stored in the map M2 that represent the best matching version maps for the corresponding pipelines.

Matching Criteria for Version Maps

The system determines the match rating for a version map for a service instance as follows. A service instance is identified by specifying the datacenter entities of the hierarchy in the path from the root of the hierarchy to the service instance. For example, the path of the service instance may include a datacenter instance (DI), a service group instance (SG, e.g., functional domain), a cell (CELL), and a service instance (SI). Furthermore, for a particular operation, the system specifies the type of environment (ENV). As an example, a target service instance path object may list the identifiers of each datacenter entity in the path and the environment as follows. For the following discussion, the environment is also treated as a datacenter entity. Accordingly, the target service instance path object is represented as a sequence of datacenter entities, each datacenter entity corresponding to a level of the hierarchy along the path from the root to the service instance.

```
}
    "ENV": "test",
    "DI": "datacenter1",
    "SG": "core",
    "CELL": "sdb",
    "SI": "test_service"
}
```

The system determines a match object for each version map. The match object specifies a type of match for each attribute of the target service instance path object. A type of match is an exact match ("exact") when the version map specifies the exact name of the datacenter entity. For example, the datacenter entity SI is "test_service" in the above example, and the version match is applicable to SI "test_service", then the match of SI is "exact." Another type of match is a regular expression match ("regex") when the version map specifies a regular expression and the datacenter entity of the target service instance path object matches the regular expression. For example, the datacenter entity SI is "test_service" and the version match is applicable to SI "test_*", then the match of SI is "regex".

Another type of match is a default match ("default"). The service owners specify a default version map for use when there is no exact match or regular expression match. If the default version map is used for a particular datacenter entity then the match is "default".

Another type of match is a first match ("first match"). If there are no matches, the system takes the first defined target in the best matching version map file.

Following is an example match object for the above example target service instance.

```
{
    "ENV": "exact",
    "DI": "first_match",
    "SG": "regex",
    "CELL": "default",
    "SI": "regex"
}
```

Other embodiments may use numeric values for each type of match. The precedence for a matching version map is determined as a weighted aggregate of precedence values for each datacenter entity, where the weight depends on the level of the datacenter entity in the path. Accordingly, the environment (ENV) has the highest weight, datacenter instance (DI) has the next highest weight, service group (SG) has the next highest weight, cell (CELL) has the next highest weight, and the service instance (SI) has the least weight. Each type of match is assigned a match score such that exact match has the highest score, regular expression match has the next highest score, default match has the next highest score, and first defined has the least score. The match scores of each of the datacenter entities are weighted as described above and added together to determine the match rating of the version map.

Following is an example service metadata configuration file that specifies three version map files under the vmfPaths attribute, i.e., test-vmf.yaml, stage-vmf.yaml, and prod-vmf.yaml.

```
    serviceMetadata:
        adminTeam: salesforce-team
        serviceName: salesforce
        serviceTypeId: <UUID>
        vmfPaths:
            - vmf-in/salesforce/deploy-eks/test-vmf.yaml
            - vmf-in/salesforce/deploy-eks/stage-vmf.yaml
            - vmf-in/salesforce/deploy-eks/prod-vmf.yaml
        vmfRepo: salesforce/salesforce-vmf
```

Following is an example version map file for use in test environment.

```
    targets:
        env_types:
            - name: test
              datacenter_instances:
                - name: test1-instance
                  service_group:
                    - name: sg1
                      services:
                        - name: svc1
                          service_instance: svc_inst1
                          versions:
                            - name: pipeline
                              pipeline_version: test-pipeline
                            - name: test-helm
                              artifact_version: test-helm
```

The above example provides the pipeline version and artifact versions for exact datacenter entity names. Following is another example of a version map for use in production environments.

```
    targets:
        env_types:
            - name: prod
              falcon_instances:
                - name: prod1-instance
                  functional_domains:
                    - name: salesforce-domain
                      services:
                        - name: salesforce
                          service_instance: salesforce1
                          versions:
                            - name: pipeline
                              pipeline_version: prod-pipeline
                            - name: prod-helm
                              artifact_version: prod-helm
```

Accordingly, embodiments provide several benefits for performing operations on cloud platforms. The system automates the process of selecting the correct target when generating a version map instead of asking users to manually create a new template version map, thereby saving time and reducing the possibility of errors. The system allows users to pass in their existing version maps so there is only one source of truth instead of users having to manage two copies of the same information. Furthermore, storing single copy of the version maps results in improvement in storage efficiency. The system allows services with complex multiple version map structures to make changes to parts of their version without impacting other version maps for different targets. Accordingly, the system allows modular development of version maps and related code for deployment and provisioning using cloud platforms.

Computer Architecture

Figure 15:
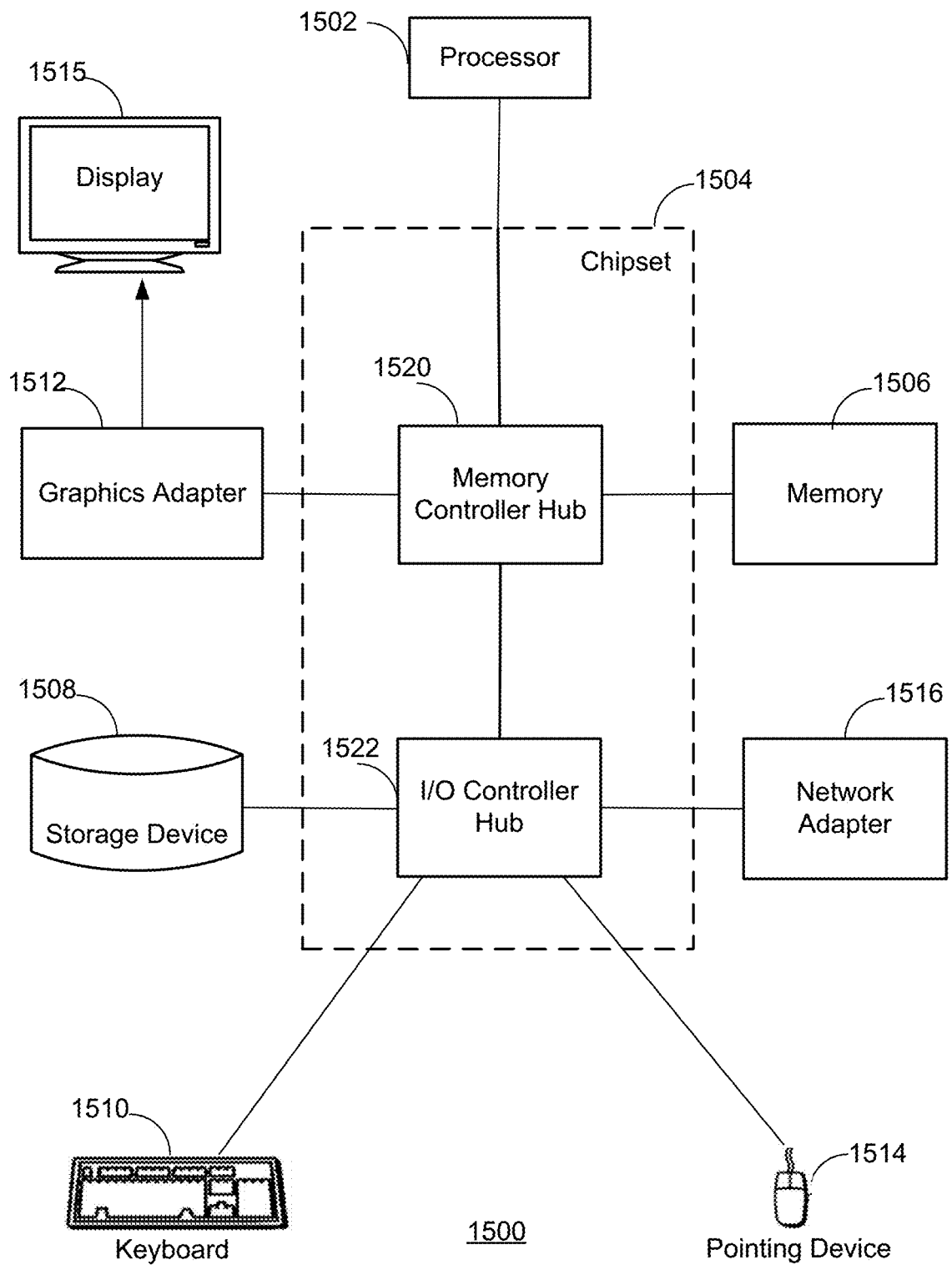
FIG. 15 is a block diagram illustrating a functional view of a typical computer system for use in the environment of FIG. 1 according to one embodiment.

FIG. 15 is a high-level block diagram illustrating a functional view of a typical computer system for use as one of the entities illustrated in the environment 100 of FIG. 1 according to an embodiment. Illustrated are at least one processor 1502 coupled to a chipset 1504. Also coupled to the chipset 1504 are a memory 1506, a storage device 1508, a keyboard 1510, a graphics adapter 1512, a pointing device 1514, and a network adapter 1516. A display 1518 is coupled to the graphics adapter 1512. In one embodiment, the functionality of the chipset 1504 is provided by a memory controller hub 1520 and an I/O controller hub 1522. In another embodiment, the memory 1506 is coupled directly to the processor 1502 instead of the chipset 1504.

The storage device 1508 is a non-transitory computer-readable storage medium, such as a hard drive, compact disk read-only memory (CD-ROM), DVD, or a solid-state memory device. The memory 1506 holds instructions and data used by the processor 1502. The pointing device 1514 may be a mouse, track ball, or other type of pointing device, and is used in combination with the keyboard 1510 to input data into the computer system 200. The graphics adapter 1512 displays images and other information on the display 1518. The network adapter 1516 couples the computer system 1500 to a network.

As is known in the art, a computer 1500 can have different and/or other components than those shown in FIG. 15. In addition, the computer 1500 can lack certain illustrated components. For example, a computer system 1500 acting as a multi-tenant system 110 may lack a keyboard 1510 and a pointing device 1514. Moreover, the storage device 1508 can be local and/or remote from the computer 1500 (such as embodied within a storage area network (SAN)).

The computer 1500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1508, loaded into the memory 1506, and executed by the processor 1502.

The types of computer systems 1500 used by the entities of a system environment can vary depending upon the embodiment and the processing power used by the entity. For example, a client device may be a mobile phone with limited processing power, a small display 1518, and may lack a pointing device 1514. A multi-tenant system or a cloud platform, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer-implemented method for performing operations on a cloud platform, the method comprising:
   receiving a request to perform an operation on a datacenter configured on the cloud platform, the datacenter associated with a set of services executing on the cloud platform;
   for a particular service from the set of services, receiving a plurality of version maps, wherein each version map provides version information for a particular context associated with the datacenter;
   creating an aggregate version map for the requested operation, comprising, selecting for the particular service, a particular version map from the plurality of version maps, the selection based on a relevance of the particular version map for a current context for the requested operation;
   generating an aggregate pipeline based on the aggregate version map;
   collecting a set of software artifacts according to the aggregate version map; and
   executing the aggregate pipeline to perform the requested operation for the datacenter, the aggregate pipeline performing the requested operation based on the set of software artifacts.

2. The computer-implemented method of claim 1, further comprising:
   receiving a declarative specification describing a target configuration of datacenter entities for the datacenter;
   accessing the datacenter to extract information describing datacenter entities currently available in the datacenter; and
   comparing the information extracted from the datacenter with the declarative specification to identify the datacenter entity on which the operation is requested to be performed.

3. The computer-implemented method of claim 2, further comprising:
   determining a failure of execution of the aggregate pipeline; and
   restarting execution of the aggregate pipeline, the restarting comprising, skipping execution of a stage of a pipeline responsive to determining based on the extracted information of the datacenter that the execution of the stage was previously completed.

4. The computer-implemented method of claim 1, wherein the particular context specifies one or more of:
   a target environment,
   a target datacenter entity, or
   a target action to be performed on the cloud platform.

5. The computer-implemented method of claim 1, wherein the operation requested to be performed on the datacenter is one of:
   provisioning a software artifact on the cloud platform,
   deploying a software artifact on the cloud platform, or
   patching a software artifact on the cloud platform.

6. The computer-implemented method of claim 1, wherein the particular version map specifies one or more of: a version of a pipeline to be used and a version of a software artifact to be used for the particular context, the particular context represented using one or more of: a target environment, a target datacenter entity, or a target action to be performed on the cloud platform.

7. The computer-implemented method of claim 1, wherein, the datacenter comprises a hierarchy of datacenter entities, wherein each datacenter entity comprises one or more of (1) a service or (2) one or more other datacenter entities.

8. The computer-implemented method of claim 1, further comprising:
performing a topological sort of services in a datacenter entity based on dependencies
configuring the datacenter on a cloud platform based on a cloud platform independent declarative specification; and
generating an aggregate pipeline comprising a hierarchy of pipelines, the hierarchy of pipelines configured for performing the operation on the datacenter configured on the cloud platform.

9. A non-transitory computer readable storage medium for storing instructions that when executed by a computer processor cause the computer processor to perform steps for deploying software artifacts for services executing in datacenters configured on a cloud platform, the steps comprising:
receiving a request to perform an operation on a datacenter configured on the cloud platform, the datacenter associated with a set of services executing on the cloud platform;
for a particular service from the set of services, receiving a plurality of version maps, wherein each version map provides version information for a particular context associated with the datacenter;
creating an aggregate version map for the requested operation, comprising, selecting for the particular service, a particular version map from the plurality of version maps, the selection based on a relevance of the particular version map for a current context for the requested operation;
generating an aggregate pipeline based on the aggregate version map;
collecting a set of software artifacts according to the aggregate version map; and
executing the aggregate pipeline to perform the requested operation for the datacenter, the aggregate pipeline performing the requested operation based on the set of software artifacts.

10. The non-transitory computer readable storage medium of claim 9, wherein the instructions further cause the computer processor to perform steps comprising:
receiving a declarative specification describing a target configuration of datacenter entities for the datacenter;
accessing the datacenter to extract information describing datacenter entities currently available in the datacenter; and
comparing the information extracted from the datacenter with the declarative specification to identify the datacenter entity on which the operation is requested to be performed.

11. The non-transitory computer readable storage medium of claim 9, wherein the particular context specifies one or more of:
a target environment,
a target datacenter entity, or
a target action to be performed on the cloud platform.

12. The non-transitory computer readable storage medium of claim 9, wherein the operation requested to be performed on the datacenter is one of:
provisioning a software artifact on the cloud platform,
deploying a software artifact on the cloud platform, or
patching a software artifact on the cloud platform.

13. The non-transitory computer readable storage medium of claim 12, wherein the particular version map specifies one or more of: a version of a pipeline to be used and a version of a software artifact to be used for the particular context, the particular context represented using one or more of: a target environment, a target datacenter entity, or a target action to be performed on the cloud platform.

14. The non-transitory computer readable storage medium of claim 9, wherein, the datacenter comprises a hierarchy of datacenter entities, wherein each datacenter entity comprises one or more of (1) a service or (2) one or more other datacenter entities.

15. The non-transitory computer readable storage medium of claim 9, wherein, the datacenter comprises a hierarchy of datacenter entities, wherein each datacenter entity comprises one or more of (1) a service or (2) one or more other datacenter entities.

16. The non-transitory computer readable storage medium of claim 9, wherein the instructions further cause the computer processor to perform steps comprising:
performing a topological sort of services in a datacenter entity based on dependencies
configuring the datacenter on a cloud platform based on a cloud platform independent declarative specification; and
generating an aggregate pipeline comprising a hierarchy of pipelines, the hierarchy of pipelines configured for performing the operation on the datacenter configured on the cloud platform.

17. A computer system comprising:
a computer processor; and
a non-transitory computer readable storage medium for storing instructions that when executed by the computer processor, cause the computer processor to perform steps for configuring datacenters in a cloud platform, the steps comprising:
receiving a request to perform an operation on a datacenter configured on the cloud platform, the datacenter associated with a set of services executing on the cloud platform;
for a particular service from the set of services, receiving a plurality of version maps, wherein each version map provides version information for a particular context associated with the datacenter;
creating an aggregate version map for the requested operation, comprising, selecting for the particular service, a particular version map from the plurality of version maps, the selection based on a relevance of the particular version map for a current context for the requested operation;
generating an aggregate pipeline based on the aggregate version map;
collecting a set of software artifacts according to the aggregate version map; and
executing the aggregate pipeline to perform the requested operation for the datacenter, the aggregate pipeline performing the requested operation based on the set of software artifacts.

18. The computer system of claim 17, wherein the instructions further cause the computer processor to perform steps comprising:
receiving a declarative specification describing a target configuration of datacenter entities for the datacenter;
accessing the datacenter to extract information describing datacenter entities currently available in the datacenter; and comparing the information extracted from the datacenter with the declarative specification to identify the datacenter entity on which the operation is requested to be performed.

19. The computer system of claim 18, wherein the particular context specifies one or more of:
a target environment,
a target datacenter entity, or
a target action to be performed on the cloud platform.

20. The computer system of claim 17, wherein the operation requested to be performed on the datacenter is one of:
provisioning a software artifact on the cloud platform,
deploying a software artifact on the cloud platform, or
patching a software artifact on the cloud platform.

* * * * *